US011257393B2

(12) United States Patent
Atencio et al.

(10) Patent No.: US 11,257,393 B2
(45) Date of Patent: Feb. 22, 2022

(54) METHOD AND SYSTEM FOR EVALUATING INDIVIDUAL AND GROUP CYBER THREAT AWARENESS

(71) Applicant: Circadence Corporation, Boulder, CO (US)

(72) Inventors: Phillip Atencio, Erie, CO (US); Cassandra Brubaker, Boulder, CO (US); George A. Wright, Atlanta, GA (US); Brandon Dorris, Erie, CO (US); Peter Grundy, Niwot, CO (US); Charles A. Hardin, Decatur, GA (US)

( * ) Notice: Subject to any disclaimer, the term of this patent is extended or adjusted under 35 U.S.C. 154(b) by 518 days.

(21) Appl. No.: 16/172,276

(22) Filed: Oct. 26, 2018

(65) Prior Publication Data

US 2020/0135049 A1    Apr. 30, 2020

(51) Int. Cl.
*H04L 29/06* (2006.01)
*G09B 19/00* (2006.01)
(Continued)

(52) U.S. Cl.
CPC ......... *G09B 19/0053* (2013.01); *A63F 13/46* (2014.09); *A63F 13/822* (2014.09); *G09B 5/12* (2013.01); *H04L 63/1433* (2013.01)

(58) Field of Classification Search
CPC ... H04L 63/1433; G09B 19/0053; G09B 5/12; A63F 13/46; A63F 13/822
See application file for complete search history.

(56) References Cited

U.S. PATENT DOCUMENTS 9,325,728 B1    4/2016 Kennedy et al.
10,056,005 B2   8/2018 Morton et al.
(Continued)

FOREIGN PATENT DOCUMENTS

WO    2016/109608    7/2016

OTHER PUBLICATIONS

International Search Report and Written Opinion for PCT Application No. PCT/US2019/57436, dated Jan. 14, 2020, 17 pages.
(Continued)

*Primary Examiner* — Farid Homayounmehr
*Assistant Examiner* — Suman Debnath
(74) *Attorney, Agent, or Firm* — Weide & Miller, Ltd.

(57) ABSTRACT

A system has an evaluation server that includes at least one database storing a plurality of cybersecurity awareness evaluations, the database connected to the server, a plurality of clients connected to the server and configured to run at least one of the cybersecurity awareness evaluations for play by users on user devices, the users performing actions in the evaluation including offensive actions and defensive actions, and an evaluation dashboard including an interface configured to display scoring results of the cybersecurity awareness evaluations as determined by the server, the scoring results including a plurality of offensive component scores for at least one of the users, a plurality of defensive component scores for at least one of the users, at least one composite offensive score for at least one of the users and at least one composite defensive score for at least one of the users, the composite offensive score being determined based on a plurality of the component offensive scores and the composite defensive score being determined based on a plurality of the component defensive scores.

20 Claims, 16 Drawing Sheets

(51) Int. Cl.
*G09B 5/12* (2006.01)
*A63F 13/46* (2014.01)
*A63F 13/822* (2014.01)

(56) References Cited

U.S. PATENT DOCUMENTS

| | | |
|---|---|---|
| 10,238,948 B2 | 3/2019 | Morton et al. |
| 2013/0014264 A1 | 1/2013 | Kennedy et al. |
| 2014/0237545 A1* | 8/2014 | Mylavarapu ........ H04L 63/1433 726/3 |
| 2017/0093904 A1 | 3/2017 | Ng et al. |
| 2017/0104778 A1* | 4/2017 | Shabtai ................. G06F 21/552 |
| 2017/0104780 A1 | 4/2017 | Zaffarano et al. |

OTHER PUBLICATIONS

Confese PhishMe, Simulated Phishing Training, https://confese.com/product-services/phishme/, printed Feb. 27, 2018, 12 pages.
Ironschool, Attack Simulation and Phishing Awareness Training, https://ironscales.com/security-awareness-training-ironschool/, printed Feb. 27, 2018, 7 pages.
Knowbe4, Identify and Respond to Email Threats Faster with PhishER, https://www.knowbe4.com/products/phisher, printed Feb. 27, 2019, 5 pages.
Wombat Security, ThreatSim Phishing Simulations: How It Works, https://www.wombatsecurity.com/products/threatsim-how-it-works, printed Feb. 27, 2019, 7 pages.

* cited by examiner

| | | | | SCORE SUMMARIES FOR DIRECT REPORTS | | | | | |
|---|---|---|---|---|---|---|---|---|---|
| | | | | | | | | Search: | |
| First Name | Last Name | Time Since Last Play | Total Play Time (Qtr) | Risk Reduction Score | Risk Reduction Percentile | Risk Reduction Trend | Alerts | Winning Percentage | Game Outcome Distribution |
| Aaron | Fuller | 6 days | 119 minutes | 88.7 | 90th | | 0 | 51% | |
| Jose | Beck | 3 days | 71 minutes | 88.1 | 87th | | 1x Info | 52% | |
| Dalton | Jennings | 1 day | 28 minutes | 82.9 | 82nd | | 0 | 37% | |
| Candice | Castro | 93 days | 0 minutes | 67.8 | 61st | | 1x Critical | 17% | |
| Jeremy | Lynch | 4 days | 92 minutes | 61.3 | 57th | | 1x Medium | 14% | |

| | | | | | | | SCORE SUMMARIES FOR DIRECT REPORTS | | | | | | | | 702 |
|---|---|---|---|---|---|---|---|---|---|---|---|---|---|---|---|
| | | | | | | | | | | | | | | Search: | |
| First Name | Last Name | Risk Reduction Score | Risk Reduction Percentile | Risk Reduction Trend | Adverse Information | Detection and Prevention | Email and Internet Safety | Access Control | Password Practices | Privacy and Digital Hygiene | Physical and Device Safety | Policies and Procedures | Education and Awareness | Sensitive Information Handling |
| Aaron | Fuller | 88.7 | 90th | | 84% | 86% | 62% | 78% | 74% | 79% | 71% | 89% | 91% | 90% |
| Jose | Beck | 86.1 | 87th | | 74% | 78% | 89% | 84% | 88% | 82% | 79% | 93% | 99% | 68% |
| Dalton | Jennings | 82.9 | 82nd | | 82% | 79% | 74% | 79% | 71% | 89% | 85% | 83% | 90% | 68% |
| Candice | Castro | 67.9 | 61st | | 42% | 41% | 37% | 18% | 79% | 82% | 70% | 81% | 88% | 61% |
| Jeremy | Lynch | 61.3 | 57th | | 38% | 42% | 31% | 27% | 74% | 79% | 71% | 15% | 92% | 62% |
| | | | | | | | | | | | | | Previous | | Next |

FIG. 7

| Metric | Player Value | Player Trend | Department Average | Department Trend | Company Average | Company Trend | Player Percentile |
|---|---|---|---|---|---|---|---|
| Awareness | | | | | | | |
| Threat Concepts | 89.23 | | 45.33 | | 53.41 | | 90 |
| Risk Mitigation | 89.23 | | 45.33 | | 53.41 | | 90 |
| Defensive Strategies | 89.23 | | 45.33 | | 53.41 | | 90 |
| Defensive Tactics | 89.23 | | 45.33 | | 53.41 | | 90 |
| Conceptual Awareness | 89.23 | | 45.33 | | 53.41 | | 90 |
| Applied Awareness | 89.23 | | 45.33 | | 53.41 | | 90 |
| Total Awareness | 89.23 | | 19.85 | | 27.38 | | 99th |

METHOD AND SYSTEM FOR EVALUATING INDIVIDUAL AND GROUP CYBER THREAT AWARENESS

FIELD OF THE INVENTION

Embodiments of the present invention relates to a system for enhancing cyber security awareness.

BACKGROUND OF THE INVENTION

Many data breaches begin by exploiting an organization's employees in order to gain access to protected systems and private information. Many such exploits take advantage of human nature to gain access. For example, a social engineering attack tries to leverage societal norms and their target's innate desire to appear helpful, friendly, or intelligent to cause the target to reveal private information. Similarly, a phishing attack may attempt to create a sense of urgency, fear, or panic in the recipient of an email that causes the target to visit the attacker's malicious website, thus leading to a breach. Or, an attacker may use information gained from social media or from a prior, unrelated breach to gain access, relying on the tendency of people to create memorable passwords and reuse the same password on multiple sites.

No matter the specific vector, the human element in breaches is well documented. Therefore, a key component of any organization's cybersecurity defense program must be to make employees aware of the multifarious threats and provide them with the tactics, techniques, and procedures to individually guard against these human-centric threats.

Security awareness is a significant and important challenge for organizations, whether commercial, academic, or government. However, while the need for increased understanding of security concepts and hygiene in the workforce has been understood and publicized for years, instilling effective security awareness in the workforce remains an important security industry problem. Therefore, effective employee cybersecurity awareness training that leads to improved decisions in handling sensitive data, social media, web hygiene, and other behaviors is amongst the most important tools an organization has to improve its defensive posture.

Currently, cybersecurity training, awareness, and enforcement programs for members of an organization's general workforce tend to use a three-part program, including classroom training, formal assessments and live training. Classroom training has been used to inform employees about threats and best-practices for defense. These can be delivered in a "live" or "self-directed" format and may be online or in-person, though most often these courses are delivered as PowerPoint presentations or pre-recorded videos. Often, organizations will do an initial training during onboarding followed up by refresher briefings (generally annual) that seek to update employees with new information and/or reinforce organizational policies.

Typically coupled with classroom training, formal assessments seek to ensure that employees can recall and recite the information provided in the classroom training. These assessments are generally provided as short, online multiple-choice tests that are graded in real-time, and employees must usually receive an organizationally-defined "passing grade" in order to receive credit for their training. Often, employees who fail to meet the scoring criteria are given an opportunity to retake the test until they pass, and failure to complete training with a passing grade generally results in disciplinary action. While most professionals agree that these assessments do not provide much or any value, they are often required to fulfill an organization's metrics-based compliance obligations.

Periodically, organizations will conduct live training/testing exercises that attempt to reinforce safe cybersecurity behaviors and/or uncover workforce security weaknesses by placing employees into controlled, semi-realistic attack situations and testing their response. This type of exercise most commonly takes the form of a simulated phishing campaign, an exercise where the organization sends phishing emails to its own employees in order to give users a realistic but safe way to improve their phishing detection skills. Users who ignore or report the email (if such reporting tools exist) effectively "pass" the training, while those users who open the payload "fail" the training and may be subject to refresher training, discipline, or more-frequent live exercises. Many third-party services exist to facilitate this and other types of live training exercises for the general workforce.

Prior products provide a suite of tools to facilitate classroom training, formal assessment, live testing, and results analysis, and to integrate with the organization's learning management systems (LMS), but they all suffer from a common set of problems. Classroom training and assessment programs, whether developed in-house or provided by third-parties specializing in such training, vary greatly across organizations and providers in terms of quality and effectiveness. These programs run the gamut from simple "compliance training" to practical steps users can take to improve their cybersecurity defensive posture. Most third-party products exist to serve companies that are either at the second (compliance) or third level (awareness) of the Security Awareness Maturity Model as developed by SANS.org.

With few exceptions, existing training products and programs use a boring, passive, and unengaging presentation format that leads to lower retention, rather than an engaging, memorable, and enjoyable format that would lead to better retention. Even the existing products that attempt to "gameify" the learning experience do so with rudimentary "game" mechanics, such as "choose your own adventure"-style stories or "Jeopardy!"-style rapid-fire knowledge checks. These attempts at gamification only provide a subtle enhancement over what is essentially rote memorization. Additionally, most existing programs include threat information and defensive techniques that are outdated, unrealistic, or irrelevant, and they do not convey practical, actionable information that members of the general workforce can use to defend themselves on a daily basis.

The effectiveness of security awareness training programs is generally measured either through formal evaluations that do not adequately predict the performance of trainees against realistic threats or through live exercises that focus too heavily on a single threat vector (usually phishing). While some products exist to address other threat vectors, these products are far less common and still fail to address the practical reality of the dynamic, evolving threat landscape in a meaningful way. Most security awareness programs rely too heavily on the "stick" (i.e., disciplinary action) to ensure compliance rather than on the "carrot" (i.e., intrinsic or extrinsic rewards) to foster cultural changes around security.

In all cases, programs and products for general workforce cybersecurity training typically result in less-than-optimal real-world results. However, because there are few or no higher-quality alternatives, these suboptimal products represent the current state-of-the-art for general workforce cybersecurity training, meaning that even the best products leave skills and knowledge gaps that can be easily exploited by attackers.

It would be advantageous if a system and method could be developed to overcome the above-described problems.

SUMMARY OF THE INVENTION

In preferred embodiments of the invention, a system and corresponding methods include a server including a processor and a memory, the memory storing non-transitory machine-readable code to be executed by the processor, at least one database storing a plurality of cybersecurity awareness evaluations, the database connected to the server, a plurality of clients connected to the server and configured to run at least one of the cybersecurity awareness evaluations by users on user devices, the users performing actions in the evaluation including offensive actions and defensive actions, and an evaluation dashboard including an interface configured to display scoring results of the cybersecurity awareness evaluations as determined by the server based on the offensive and defensive actions, the scoring results including a plurality of offensive component scores for at least one of the users, a plurality of defensive component scores for at least one of the users, at least one composite offensive score for at least one of the users and at least one composite defensive score for at least one of the users, the composite offensive score being determined based on a plurality of the component offensive scores and the composite defensive score being determined based on a plurality of the component defensive scores.

Further objects, features, and advantages of the present invention over the prior art will become apparent from the detailed description of the drawings which follows, when considered with the attached figures.

DESCRIPTION OF THE DRAWINGS

FIG. 4 is a drawing illustrating an evaluation dashboard interface displaying scoring in accordance with embodiments of the invention.

FIG. 7 is a drawing illustrating an evaluation dashboard interface displaying scoring in accordance with embodiments of the invention.

FIG. 8 is a drawing illustrating an evaluation dashboard interface displaying scoring in accordance with embodiments of the invention.

FIG. 13 is a drawing illustrating an evaluation dashboard interface displaying scoring in accordance with embodiments of the invention.

FIG. 15 is a drawing illustrating an evaluation dashboard interface displaying scoring in accordance with embodiments of the invention.

FIG. 16 is a drawing illustrating an evaluation dashboard interface displaying scoring in accordance with embodiments of the invention.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The system in accordance with embodiments of the invention includes a database, a server, an evaluation dashboard and clients. The system presents an evaluation to deliver cybersecurity awareness and skills training to users. The system utilizes an application for electronic devices such as mobile phones, which hosts the user's interface; a server to help users find opponents to play against, synchronize evaluations across devices, serve content, score and analyze evaluation metrics, and provide individual and aggregate performance reports; global and customer-specific databases to house the evaluation's rulesets, evaluation content, user profiles, evaluation data, and metrics; and an organizational evaluation dashboard for onboarding new users, managing user accounts and training plans, viewing user and workforce training results, managing evaluation content and add-ons, and viewing organizational risk information.

One aspect of the invention is machine-readable code, such as stored in a memory associated with the server and run by a processor, which is configured to implement the functionality/methods described below.

Figure 1:
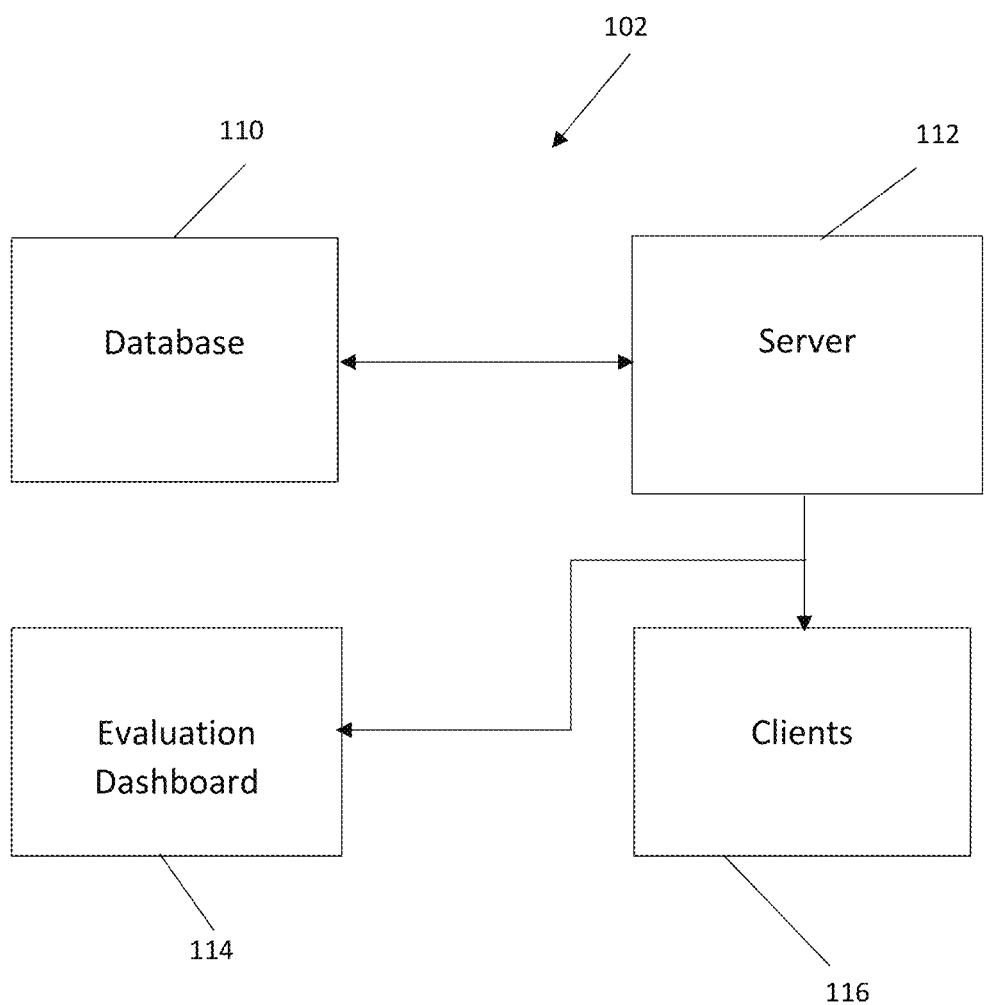
FIG. 1 is a system architecture overview illustrating the server, database, evaluation dashboard and clients in accordance with embodiments of the invention.

FIG. 1 illustrates the system 100 in accordance with embodiments of the invention. The system includes at least one database 110, a server 112, an evaluation dashboard 114 and clients 116. Other elements not shown could be added in accordance with embodiments of the invention.

The database 110 hosts evaluations including all rulesets, ruleset versions and other evaluation content. It can also host customer or user specific content and a logging database. The database 110 privately stores evaluation data for each session and each user. The database 110 may be a computer having a memory for storing the above elements and a processor configured to perform functionality in accordance with the embodiments of the invention described herein.

The server 112 may be a cloud-hosted server application, or any other known type of server, that includes user management systems, evaluation session management and a synchronization system, as well as scoring, analysis and reporting systems, as further described below. The scores described below may all be determined by the server 112. The database 110 and the evaluation dashboard 114 may be a part of the server 112, or may be separate elements connected together.

The evaluation dashboard 114 may be a web-based application providing settings, training plans and content management interfaces, user onboarding, management and analysis interfaces, as well as workforce population tracking and analysis interfaces, as further described herein. The evaluation dashboard 114 provides a central portal for viewing evaluation metrics; analyzing user, departmental, and corporate engagement, learning, awareness, and risk; sending notifications to users and their managers; managing user and administrative accounts; setting learning objectives; managing evaluation content and settings; and administering the server. Data for these functions are computed by the server 112 and stored in a customer-specific database.

Nominally, the evaluation dashboard 114 is designed for use by an organization's management team, human resources representatives, information technology administrators, and security staff, or others to enable these individuals to view and track user performance, progress towards goals, and potential risk factors. As such, the evaluation dashboard 114 may require authentication to access, and access to various functions or data within the dashboard can be controlled based on the user's role.

For viewing data related to evaluations, risk, learning, awareness, and engagement, the evaluation dashboard 114 provides methods to display data and metrics at various levels of aggregation, and all historical data are kept. At the lowest level of aggregation, learning, risk, engagement, and single-evaluation data can be viewed for individual users, and at higher levels of aggregation, these values can be rolled up and viewed by department, division, user classification, or as company-wide values. Metrics are displayed as their "current value," and historical values, trend lines (i.e., plots of score over time), and percentile ranks (among others) can also be displayed in the evaluation dashboard 114.

Within the evaluation dashboard 114, managers and other administrators can set up automated alerts based on user scores, engagement, and other factors to flag potential risks and prominently display them in the evaluation dashboard. When an alert is triggered, notifications can be sent to the relevant users. For example, an automated alert can be sent out to all users who have not done at least one complete evaluation in the past 90 days. As another example, all users in the organization could be sent an alert when new evaluation content is available or when new threat data are received. Notifications can be delivered as "push notifications" to the user's client application, as emails, or text messages, and managers and others can be copied on notifications. Notifications can also be sent out manually/on-demand from the dashboard, as required, with the same set of notification options available in manual mode.

The evaluation dashboard 114 also provides periodic reporting to cognizant management and administrative staff who may or may not have access to the dashboard itself. These reports can be delivered by email with a PDF attachment or through a special link to a view-only, non-authenticated dashboard page. Reports are configurable and can contain any data viewable on the evaluation dashboard 114 across any time horizon.

The evaluation dashboard 114 provides functionality to manage user and dashboard accounts. For users (employees), this includes creating and managing user profiles (name, department, email, role/title, manager, login info, etc) and setting and tracking individual goals and learning objectives. When new users are added, it also provides a means for notifying the user about the company's training program and pushing invitation/configuration links to those employees to enable them to download and set up the client. The evaluation dashboard 114 provides an interface to allow managers to populate the user's profile with external training and assessment data so that those data can be correlated with system data. These data sources can be manually entered, imported from a file, or linked with other training and assessment tools' databases. Finally, the evaluation dashboard 114 provides a way to suspend, disable, delete, and/or archive user accounts if the employee leaves the company or no longer needs access to the system.

For managers, administrators, and other cognizant individuals who need access to the evaluation dashboard 114, the user management system may allow individual user accounts to be granted access to the dashboard and given a role that controls their access to the evaluation dashboard. Roles and role access rules are defined within the user management system. Default roles include "system administrator", "manager", "agent," and "user."

System administrators may have full access to the evaluation dashboard's administrative functions (e.g., server control, user management, content management, etc.) but do not have access to any user data (including their own) and cannot be granted such access. These special accounts are intended only for those users who need to manage the backend servers and systems, manipulate company-wide settings, manage content and users, and perform other administrative functions.

Managers may have default access to view and analyze the user data of any users that they directly or indirectly manage, including their own data. They do not have system administration privileges and cannot manipulate user data, change access controls or roles, or manage evaluation content. These accounts are intended to be used by the company's management to view and analyze user awareness, corporate and organizational risk factors, and other cybersecurity-relevant data; set training plans; and track issues.

Agents are managers with the added ability to manipulate user data, access controls, and roles, but they lack permission to administer the system. Unlike managers, agents may have no default access to view and analyze user data; they must be granted the appropriate access by another agent (with the appropriate permissions) or a system administrator. Agents can be given access to user data at the individual level or at various levels of granularity, as needed. These accounts are intended to be used by individuals in security, IT, HR, legal, privacy, or compliance roles who have cognizance over individuals outside their reporting line or who are tasked with helping to coordinate personnel onboarding and departures.

Users may have default access to only their own data, and they cannot manage their account information or be given permissions to view other users' data. These accounts, if enabled, can be only used by individual users to view and analyze their own learning data and plans.

Finally, the system provides interfaces to define new roles and role types based on existing role and role type templates. By default, only system administrators can create new role types.

The evaluation dashboard 114 provides interfaces for adding new evaluation content and/or customizing content to meet the organization's needs. Authorized users can browse a content "store", purchase or download free new content modules and upgrades, and download those modules for use with their system instance. Content modules can be enabled and disabled from this interface on a per-user basis.

Customizable content can also be viewed and edited from this interface. This includes editing the evaluation's color schemes, logos and graphics, and certain metadata used within the system to customize evaluations (e.g., name of the company, name of the CEO, website address, email templates and examples, etc.). This also includes enabling and disabling certain types of content, rules, and actions, included in the base evaluation. Finally, the core evaluation's ruleset version (the basic ruleset used by the client on users' devices) can be selected in this interface.

The evaluation dashboard 114 provides interfaces to control the system servers (e.g., start, stop, restart), update the server software when patches are available, push/require client-side evaluation software updates, perform system upgrades (free or paid), manage or reset the database, or migrate the installation onto another system. These functions may only be available to system administrators, by default.

Users attempting to access the evaluation dashboard 114 from their web browser are required to supply credentials (e.g., username and password). Once authenticated, users are directed to the appropriate role-based dashboard landing.

The clients 116 may include native applications for mobile or other operating systems, that include user management interfaces, evaluation management interfaces, evaluation interfaces, educational interfaces and post-play debriefing interfaces, as further described herein.

Users may elect to play an evaluation using the client 116 on a device in single- or multi-user mode. The device is preferably a mobile device, such as a smartphone, tablet, or other mobile device, but potentially could be any electronic device with a screen and user input devices capable of running applications, such as a desktop computer, television or other computerized device. Single users will play the evaluations against computer competitors, whereas multi-user mode will enable groups of two or more users to compete in the evaluation against each other in real time. Once a match begins, users will be presented with various actions that they may take in order to (1) protect their user's virtual data assets, and (2) attack their competitors' virtual data assets. In some embodiments, the winner of a match may be the "last user standing." Users can use built-in educational information available in-evaluation to help inform their selections and balance evaluation trade-offs. Evaluation progress information, including current scores for all users, are shown during the evaluation to help users understand how their actions are impacting the evaluation and their proficiency relative to competitors.

At the end of the evaluation, final evaluation results for each user are tallied by the server 112, recorded in the database 110, and presented to the users, such as via an interface on the client 116. For each match, every user is given a relative ranking for that match (e.g., first place, second place, etc.) as well as a set of scores.

Figure 2:
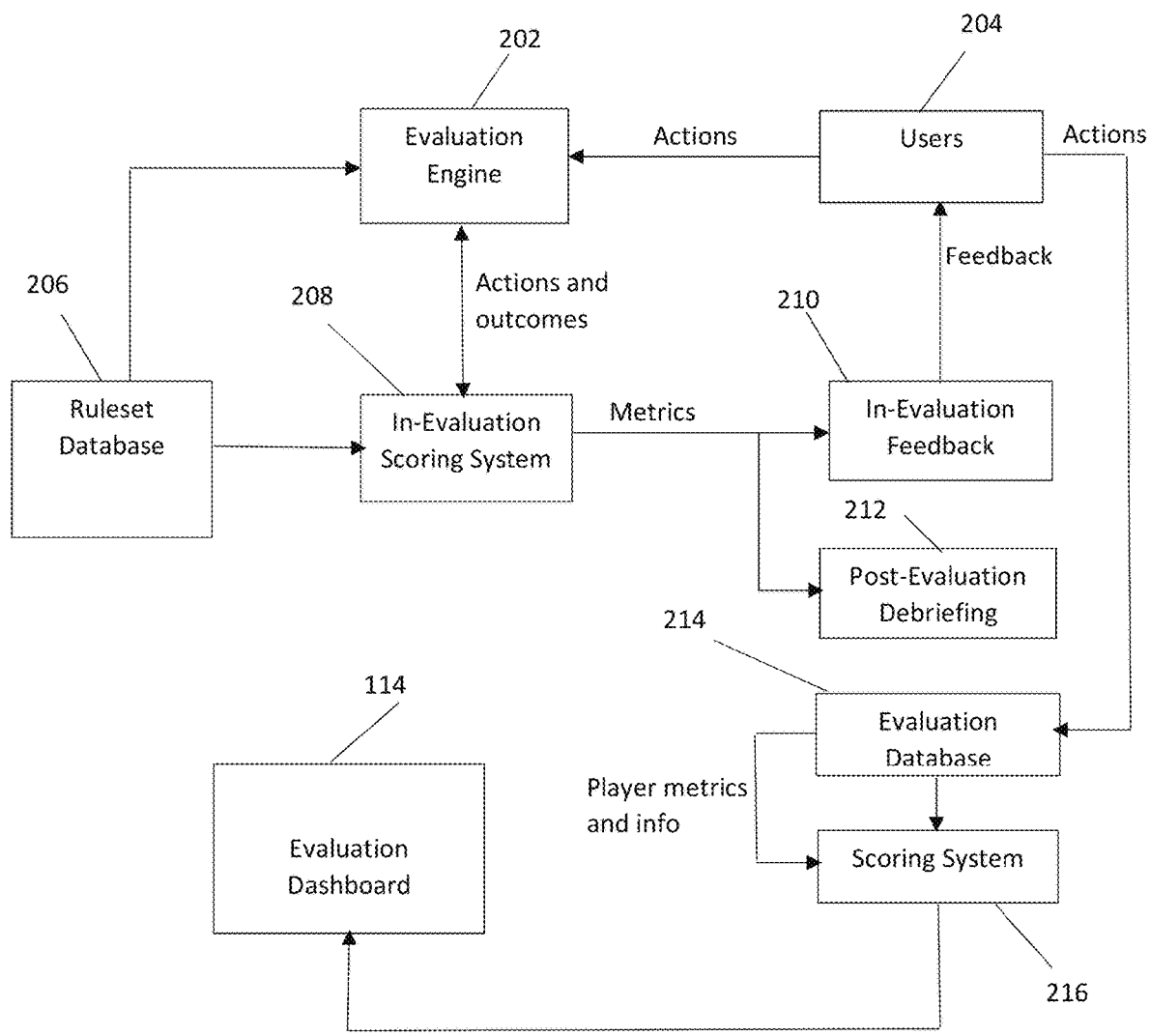
FIG. 2 is a model function overview illustrating elements in accordance with embodiments of the invention.

FIG. 2 illustrates systems for computing and displaying scores, feedback, post-evaluation results, and workforce information and relationship between entities used in computation and display of user scores according to embodiments of the invention. Users 204 play the evaluation on a client and the actions taken by the users are fed to the evaluation engine 202. The actions taken by the users and the outcomes resulting therefrom are directed to the in-evaluation scoring system 208, which analyzes offensive and defensive strategies and tactics and utilizes behavioral analysis to perform in evaluation scoring. Metrics of the In-Evaluation Scoring are sent to In-Evaluation Feedback 210 and Post-Evaluation Debriefing 212, which provide feedback to the users on the clients. The Ruleset Database 206 sets rules used by the In-Evaluation Scoring System 208 and utilizes rule properties including behavioral categories, severity and impact, importance and relevance, in-evaluation impact and in-evaluation probability of success. The Ruleset Database 206 also provides the set of allowable user actions and metadata to the evaluation engine 202.

The evaluation engine 202 takes the action set and privately presents a pseudo-random subset of those allowable actions (typ. 3) to each user 204 during each round. Each round, every user 204 selects one or more actions to take from the subset that is presented to them. The subsets presented to each user 204 are randomized each round based on selection probabilities contained within the metadata. Other metadata associated with each action include the prerequisite conditions that must be met in order to perform an action successfully, as well as the effects of that action on the evaluation and other users 204.

Actions by the users are also fed from the clients to evaluation database 214, from which user metrics and info are fed to the scoring system 216. Scoring system 216 calculates the various user and organizational scores for display on evaluation dashboard 114.

Scores may include numerical and categorical ratings based on the outcome of the current match, scores that provide a measure of the user's decision-making and conceptual understanding independent from the outcome of the match, and scores that track the user's progress over time toward cybersecurity training goals. Scores may be presented as compositions of various component scores.

Component scores are computed for individual behaviors, user skills, topical and conceptual areas, user strategies, etc, as encoded by the evaluation's ruleset, providing a way to link the organization's desired behavioral outcomes (e.g., social media hygiene, phishing avoidance and reporting, etc.) against in-evaluation outcomes. Each component score is then aggregated into one or more composite scores using a mathematical function that balances the relative importance of each component. Management or others can view user scores and score trends at either the component or composite level for segments of a workforce to track trends over time. Management or others can also view individual and workforce training and awareness improvement score patterns to determine if and by how much users are improving relative to company goals. Finally, the evaluation system provides an estimate of organizational risk reduction based on population learning trends and current real-world threat data, as further explained herein.

The algorithms that compute learning and risk reduction outcomes weight various component and composite scores to estimate learning and risk. These weights are initially determined by expert analysis but may be automatically tuned by embodiments of the invention based on the outcome of verification and validation testing. Test results—used primarily to tune educational content and to determine the efficacy of the evaluation as a training tool relative to industry-standard training systems—are mined for correlations between users' in-evaluation actions and their awareness and training outcomes to compute new score weights that will produce learning scores that best predict actual user learning.

Behavioral and categorical weighting values can also be tuned to put more emphasis on specific pedagogical goals by focusing users' attentions to this information through the feedback and scoring system in accordance with embodiments of the invention. Concepts, actions, strategies, and behaviors that are emphasized in the feedback and scoring systems may receive greater attention from users seeking to raise their scores. These weights are initially determined by expert analysis of the threat and defense landscape but can be automatically tuned in the same manner as is used to tune education outcome weighting factors (i.e., play testing) in accordance with embodiments of the invention.

Embodiments of the invention utilize scoring algorithms. The following parameters are used in the computation of the single-evaluation component and composite scores:

1. Let $B_i$ be the score for one of a set of N behaviors.
2. Let $\Omega_{j,i}$ be the scoring "weight" for an offensive action, $OA_j$ one of J offensive actions associated with $B_i$. Note that offensive actions are associated with one and only one behavior.
3. Let $P_{k,j}$ be the scoring "weight" for defensive action, $DA_k$ one of K defensive actions associated with offensive action, $OA_j$. These weights are treated as reductions in the probability of success for an offensive action. In the case where defensive actions lose effectiveness over time, $P_{k,j}$ will be the average effectiveness over the time $DA_k$ is active.

The value and/or value vector assigned for each parameter instance is based upon the specific component score being evaluated. For example, the values of $P_{k,j}$ used in the calculation of the Defensive Behaviors component scores are not necessarily the same as the values of $P_{k,j}$ used in the calculation of the Defensive Posture by Attack Phase component scores. Specific values of each parameter for each component score are described further herein.

The defensive score for all actions $DefAll_i$ associated with behavior i for any point during an evaluation is:

$$DefAll_i = \frac{1}{M}\sum_j^M \sum_k^K P_{k,j},$$

where each action $DA_k$ has been played and is active and where M is the total number of possible offensive actions.

The defensive score for effective actions $DefEff1_i$ associated with behavior i for at any point during an evaluation is:

$$DefEff1_i = \frac{1}{M}\sum_j^M \Omega_{j,i},$$

where each action $OA_j$ has been blocked and where M is the number of blocked offensive actions.

Defensive Effectiveness Using Stochastic Correction Method: This variation of defensive effectiveness accounts for random outcomes. For this variation, the defensive score for effective actions $DefEff2_i$ associated with behavior i for at any point during an evaluation is:

$$DefEff2_i = \frac{1}{M}\sum_j^M \Omega_{j,i}\sum_k^K P_{k,j},$$

where action each $OA_j$ has been played but is blocked and $DA_k$ has been played and is active and where M is the number of blocked offensive actions.

A final variation of defensive effectiveness, Realizable Defensive Effectiveness RealDefEff, takes into account the defensive effectiveness that could be realized if all offensive actions launched against a user succeeded in reaching said user. In this case, the user is credited for any active defenses matched against actual attacks, even if those attacks fail to reach the user. Likewise, the user is penalized for any defensive gaps matched against actual attacks, even if those attacks fail to reach the user. This realizable effectiveness is computed as:

$$RealDefEff_i = \frac{1}{M+N+P}\left(DefEff2_i + \sum_g^N \Omega_{g,i}\sum_k^K P_{k,g} - \sum_f^P \Omega_{f,i}\right),$$

where the following conditions are met:
  Each action each $OA_f$ has been played against the user. The user that lacks any defense against action $OA_f$, but the action fails to reach the user for some reason other than defense (i.e., the attacker lacks the necessary skill to play the action and thus the action fails to "launch").
  Each action each $OA_g$ has been played against the user. The user has active defenses against action $OA_g$, but the action fails to reach the user for some reason other than defense (i.e., the attacker lacks the necessary skill to play the action and thus the action fails to "launch").
  P is the number of failed offensive actions where the user has no defenses.
  N is the number of failed offensive actions where the user has active defenses.
  M is the number of blocked offensive actions (per the computation of $DefEff2_i$).

Defensive Posture by Behavior: The defensive score for effective actions $DefPos_i$ associated with behavior i for at any point during an evaluation is:

$$DefPos_i = \frac{1}{M}\sum_j^M \Omega_{j,i}\sum_k^K P_{k,j},$$

for each possible $OA_j$ and where $DA_k$ has been played and is active. In this case, M is the total number of possible offensive actions.

Offensive Behaviors: The offensive score $OffAll_i$ associated with behavior i at any point during an evaluation is:

$$OffAll_i = \frac{1}{J}\sum_j^J \Omega_{j,i},$$

where action $OA_j$ has been played.

Baseline Offensive Effectiveness: The offensive score $OffEff1_i$ associated with behavior i for at any point during an evaluation is:

$$OffEff1_i = \frac{1}{J}\sum_j^J \Omega_{j,i},$$

where each action $OA_j$ has been played and is successful (not blocked).

Offensive Effectiveness Using Stochastic Correction Method: Accounting for random outcomes, the offensive score OffEff2$_i$ associated with behavior i for at any point during an evaluation is:

$$OffEff2_i = \frac{1}{J}\sum_j^J \Omega_{j,i}\left(1 - \prod_k^K (1 - P_{k,j})\right),$$

where each action OA$_j$ has been played and is successful (not blocked).

Composite Behavior Scores: The composite behavior score BAll$_i$ is computed as:

$$BAll_i = \frac{DefAll_i}{P_{Ave}} + \frac{OffAll_i}{\Omega_{Ave}}.$$

Composite Effectiveness Scores: The composite effectiveness score BEff1$_i$ is computed as:

$$BEff1_i = \frac{DefEff1_i}{\Omega_{Ave}} + \frac{OffEff1_i}{\Omega_{Ave}}.$$

Alternatively, the composite effectiveness score BEff2$_i$ may be computed as:

$$BEff2_i = \frac{DefEff2_i}{\Omega_{Ave}P_{Ave}} + \frac{OffEff2_i}{\Omega_{Ave}},$$

when using the stochastic correction method to account for random evaluation outcomes, or:

$$BEff3_i = \frac{RealDefEff_i}{\Omega_{Ave}P_{Ave}} + \frac{OffEff2_i}{\Omega_{Ave}},$$

when incorporating realizable defensive effectiveness.

Total Behavioral Score: The total score for a user for all actions CompAll is given by:

$$CompAll = Y_i\sum_i^N BAll_i,$$

where Y$_i$ is an importance weighting factor for behavior i.

Total Effectiveness Score: The total score for a user for effective actions CompEff is given by:

$$CompEff = Y_i\sum_i^N BEffX_i,$$

where the computation may use either the baseline behavioral effectiveness scores (BEff1$_i$), the stochastically-corrected behavioral effectiveness scores (BEff2$_i$), or the realizable defensive effectiveness scores (BEff3$_i$) for the values of BEffX$_i$.

Total Defensive Posture Score: The total score for a user for defensive posture DefPos is given by the following:

$$DefPos = Y_i\sum_i^N DefPos_i,$$

Risk Mitigation is computed in two steps: the first step computes the Current Risk Mitigation CRM(r) sub-score for the current round r, which is the incremental amount of risk to the user that was mitigated by defensive actions during that round; and the second step computes the user's Total Risk Mitigation score TRM(r) at the current round r given all in-evaluation defensive actions taken to that point. For Current Risk Mitigation:

$$CRM(r) = CRM(r-1) + \sum_k^K\sum_j^M \alpha_{j,k},$$

where each action OA$_j$, whether played or not, could theoretically be blocked by some defensive action DA$_k$ that has been played in the current round r. In this case, M is the total number of possible offensive actions, K is the total number of defensive actions played in the round, and $\alpha_{j,k}$ is the scoring weight related to the offensive action OA$_j$ that could be theoretically blocked by one of the DA$_k$ played in the round.

Then, the Total Risk Mitigation score for any given round r is the area under the CRM(r) curve:

$$TRM(r) = \sum_{t=1}^r \left(\frac{CRM(t) + CRM(t-1)}{2}\right),$$

where CRM(0)=0. The value of TRM after the final round has been played determines the user's overall risk mitigation score for that evaluation.

The set of values of CRM(r) for each round of the evaluation represent the user's risk mitigation profile and are used to determine a categorical classification for the user's relationship to risk. To compute the user's progression profile, the user's CRM scores for each round r are normalized by the user's highest CRM score for any round:

$$CRM_{norm,user}(r) = \frac{CRM_{user}(r)}{CRM_{max,user}},$$

The user's normalized CRM progression is then compared to several baseline profile shapes in order to determine that user's classification. Baseline profiles are universal, pre-computed CRM profiles that have been normalized (using the same method above) and fit with a smooth, continuous function in r. This continuous function in r allows the pre-computed baseline profile to be sampled in any arbitrary number of rounds that a user might have played. At the end of the evaluation but before computing the user's Risk Mitigation Profile classification, each baseline profile is sampled in r such that there are the same number of samples in each baseline profile as there are in the user's profile. Then, the residual sum of squares (RSS) is computed between the user's normalized score profile CRM$_{norm}$ and each of the normalized and sampled baseline profiles. The user's categorical classification is then determined to be the same as that of the baseline profile corresponding to the lowest RSS value, and a category alignment factor CatAlign is computed for this classification as:

$$CatAlign = \frac{1}{n}\sum_{r=1}^{R}\left(1 - \frac{|CRM_{norm,user}(r) - CRM_{norm,baseline}(r)|}{CRM_{norm,user}(r) + CRM_{norm,baseline}(r)}\right),$$

where R is the total number of rounds played, $CRM_{norm,user}(r)$ are the user's normalized CRM values for each round r, and $CRM_{norm,baseline}(r)$ are the normalized CRM values for each round r of the baseline profile that most closely resembles the user's risk mitigation profile. The value of CatAlign can be expressed as a percentage, which may be communicated as the user's "percent similarity" to the baseline classification, such as "User is 96% Extremely Risk Adverse."

A user's Kill Chain Alignment KCA(r) is a path-dependent metric that computes the degree to which the user's defensive sequence conforms to an ideal defensive methodology, as informed by Cyber Kill Chain concepts. The metric is designed to reward users for building up layers of defensive capabilities according to the order in which attacks typically unfold (i.e., the cyber kill chain), starting with defenses that stymie the reconnaissance activities of attackers, followed by intrusion defenses, and lastly with protecting their "objective" systems. The pedagogical goal of this metric is to show users the defensive power of denying attackers a foothold early in their attack sequence by rewarding users who best conform their strategy to this ideal. Conversely, users who focus too much early energy on protecting objectives or defending against active intrusions will receive a lower KCA(r) score.

The relative sequencing of a user's defensive actions is relevant to the computation of the KCA(r) metric, as the value of playing a certain action at any given time, vis-à-vis the metric, is determined based on that action's classification and the classifications of all preceding actions. The algorithm for making this calculation involves several intermediate calculations.

First, we define the objective metric KCA(r) as the Kill Chain Alignment score at some round r during the evaluation, computed as:

$$KCA(r) = KCA(r-1) + \sum_{p}^{P} KCC_p(r) \times KCR_p(r-1) \times \sigma_p(r),$$

where KCA(0)=0, KCA(R) is the user's score at the end of the evaluation, r=[1, R], and R is the number of rounds played. In this equation, p is the kill chain phase, with p=[1, P]; nominally, P=3, where the three phases are defined as "anti-recon," "anti-intrusion," and "anti-action" for values of p={1,2,3}, respectively.

The formula for KCA(r) contains several additional variables that must be defined. $KCC_p(r)$ is the Kill Chain Count, which is the counter (integer number) of defensive actions played during a given round r and for a given phase p.

$KCR_p(r)$ is Kill Chain Remaining, which is the total number of defensive actions available but not yet played by a given user (i.e., the count of remaining actions) at the end of a given round r and for a given phase p, computed as:

$$KCR_p(r) = KCR_p(r-1) - KCC_p(r),$$

where $$KCR_p(0) = \begin{cases} \tau_p & 1 \le p \le 3 \\ undef & p > 3 \mid p < 1 \end{cases},$$

and $\tau_p$ is the total number of defensive actions at the start of the evaluation for phase p.

Lastly, $\sigma_p(r)$ is the phase weight for phase p during some round r, computed as:

$$\sigma_p(r) = \begin{cases} 1 & p = 1 \\ 2 \times \max(1, KCR_1(r))^{-1} & p = 2 \\ 3 \times \max(1, KCR_1(r) + KCR_2(r))^{-1} & p = 3 \end{cases}.$$

Higher values of KCA(R) correspond with users that deployed their defenses in a sequence that is more consistent with a defensive risk reduction strategy that is informed by the cyber kill chain concept.

Defensive Awareness: A user's defensive awareness score DefAwr is computed as:

$$DefAwr = \frac{1}{K}\sum_{k}^{K}\beta_k$$

where $\beta_k$ is the defensive awareness weight of some action $DA_k$ that is classified as a defensive awareness action and that was played by the user at some point during the evaluation. K is the total number of defensive actions of all types played by that user throughout the evaluation. Defensive awareness is, therefore, some value $0 \le DefAwr \le 1$.

Defensive Readiness: A user's defensive readiness score DefRdy is computed as:

$$DefRdy = \frac{1}{M}\sum_{k}^{K}\sum_{j}^{M}\alpha_{j,k}$$

where action each $OA_j$ has been played against the user and could theoretically be blocked by some defensive action $DA_k$ that was played by the user. In this case, M is the total number of offensive actions played against the user, K is the total number of defensive actions played by the user, and $\alpha_{j,k}$ is the scoring weigh related to the offensive action $OA_j$ that could be theoretically blocked by any of the $DA_k$ defenses played by the user during the evaluation.

Defensive readiness is, therefore, some value $0 \le DefRdy \le 1$.

Defensive Reactiveness: A user's defensive reactiveness score DefRect is computed as:

$$DefRect = \frac{1}{K}\sum_{k}^{K}\rho_k$$

where $\rho_k$ is the defensive reactiveness of some action $DA_k$ that was played by the user at some point during the evaluation. K is the total number of defensive actions of all types played by that user throughout the evaluation.

Defensive reactiveness $\rho_k$, which is defined for each defensive action $DA_k$ in the evaluation, exists on the interval [0,1], where $\rho_k=1$ is fully reactive, $0<\rho_k<1$ is partly reactive, and $\rho_k=0$ is fully non-reactive or proactive (i.e., reactivity is the reciprocal of proactivity). Therefore, a user's defensive proactiveness DefPro can easily be defined as:

DefPro=1−DefRect.

Defensive reactiveness is, therefore, some value 0≤DefRect≤1, and defensive proactiveness exists on the same interval.

Defensive Evaluation Results: The evaluation results, vis-à-vis in-evaluation user objectives, are used to compute a results score DefRes for the defense:

DefRes=$\overline{d}_{res} \cdot \overline{r}$, where $\overline{d}_{res}$ is a vector of weights and $\overline{r}$ is a vector of defensively-themed evaluation results. The evaluation results of interest include whether or not the user won the evaluation, how well the user defended their "data targets," and how many pieces of private user "intel" were discovered by other users.

The evaluation results vector $\overline{r}$ is defined as:

$$\overline{r} = \begin{bmatrix} x = \begin{Bmatrix} 0 & \text{user lost} \\ 1 & \text{user won} \end{Bmatrix} \\ y/Y \\ z/Z \end{bmatrix},$$

where y/Y is the ratio between the number of the user's surviving data targets (i.e., those successfully defended) versus total number of data targets assigned to that user, and z/Z is the ratio between the number of the user's undisclosed intel targets (i.e., those that were not discovered) versus total number of data targets assigned to that user.

Offensive Evaluation Results: As the pedagogical goal of the evaluation is to enhance user cybersecurity awareness, offensive actions and sequences are somewhat less meaningful to a user's learning. While the offensive actions provide a context and purpose for the defensive actions, there is no explicit educational content related to cyber-offense. As such, the offensive evaluation results score only attempts to ascertain whether a user's attack sequences are based on meaningful strategy and informed tactics or, on the contrary, if their actions are simply a sequence of random choices. The offensive evaluation results score OffRes is computed as:

OffRes=$\overline{o}_{res} \cdot \overline{s}$, where $\overline{o}_{res}$ is a vector of weights and $\overline{s}$ is a vector of offensively-themed evaluation results. The evaluation results of interest include whether or not the user's attacks were successful in reaching objectives, the degree to which successful attacks were based on informed choices, and the degree of luck involved in the outcome.

The evaluation results vector $\overline{s}$ is defined as:

$$\overline{s} = \begin{bmatrix} i/I \times c_{avg} \\ h/H \\ o/O \\ -L/H \end{bmatrix},$$

where the variables are defined as such:

i is the number of "intel" pieces gathered by the user at the end of the evaluation. If a user collects a piece of intel that is subsequently changed, this value is unaffected.

I is the total number of intel pieces available. This number can change throughout the course of an evaluation as a result of the actions of other users. Specifically, as a user collects intel on other users through reconnaissance actions, their opponents may deploy defenses that render useless these pieces of old intel. In this case, "new" intel becomes available, and the value of I increases to reflect this change.

$c_{avg}$ is the average number of possible values that each piece of intel can assume. This number can change throughout the course of an evaluation as a result of the actions of other users in the same manner as described for I.

h is the total number of successful hacks performed by the user.

H is the total number of hacks attempted by the user.

o is the total number of other users' objectives successfully hacked by the user.

O is the total number of other users' objectives.

L is the number of successful hacks performed by the user when the user had not yet gathered the corresponding intel and thus had to guess at its value. This value is negated to represent its use as a penalty function in computing the overall offensive evaluation results score.

Composite Tactical Score: From the component scores, the composite tactical score CompTac can be computed to be:

CompTac=$\overline{\omega}_{tac} \cdot \overline{t}$ where $\overline{\omega}_{tac}$ is a vector of tactics component weights and $\overline{t}$ is a vector of tactics component scores, defined as:

$$\overline{t} = \begin{bmatrix} DefAwr \\ DefRdy \\ DefPro \\ DefRes \\ OffRes \end{bmatrix}.$$

Overall Awareness: A user's overall awareness score A is computed for a single evaluation. This is a composite score that incorporates all other composite scores using a matrix of weighting factors:

$A = \overline{w} \cdot \overline{c}$, where $\overline{w}$ is a vector of weights and $\overline{c}$ is a vector of score components.

$$\overline{c} = \begin{bmatrix} CompAll \\ CompEff \\ DefPos \\ TRM \\ KCA \\ CompTac \end{bmatrix}.$$

Initially, the nominal set of weighting values (above) is used for $\overline{w}$ to compute A, but these weights are updated and calibrated using the procedures described further herein. Uncalibrated awareness scores are valid only as a comparative tool between users to gauge relative awareness—without calibration, these scores do not correspond to real-world awareness, but with calibration, a user's real-world awareness can be inferred from this score.

Figure 3:
FIG. 3 is a drawing illustrating an evaluation dashboard interface displaying scoring in accordance with embodiments of the invention.

FIG. 3 illustrates a scoring interface that may be displayed on the evaluation dashboard 114. The scoring interface includes a risk reduction score 302, which in the example is shown as 72 out of a possible 100 points. This risk reduction score may be Overall Awareness score described above, normalized so that values are in the range of [0,1] inclusive.

Descriptions 304 and 312 describe that the score and rank have decreased over a time period. Scoring trend 306 shows how the score has changed over a time period. Risk reduction rank 310 shows a comparison of the risk reduction score to other branches in the organization.

Figure 15:
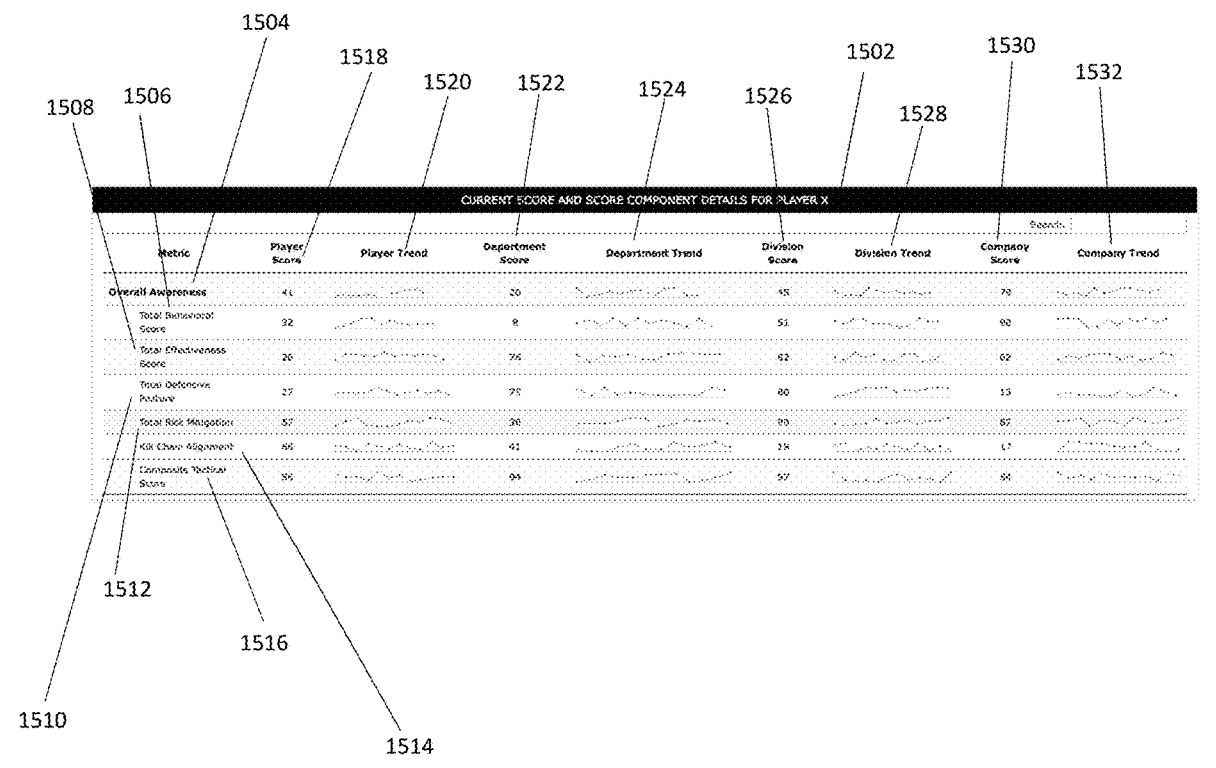

FIG. 15 illustrates an interface 1502 of the evaluation dashboard 114 displaying overall awareness 1504 and a corresponding score determined in accordance with embodiments of the invention. The interface 1502 also displays a total behavior score 1506, a total effectiveness score 1508, a total defensive posture score 1510, a total risk mitigation score 1512, a kill chain alignment score 1514 and a composite tactical score 1516, all used in determining the overall awareness score.

The interface 1502 of the evaluation dashboard 114 thus illustrates various scores determined by the system in accordance with embodiments of the invention. As used herein, a composite score is any score that the system determines by utilizing previously determined scores. A component score is any score that the system utilizes to determine other scores.

The interfaces of embodiments of the invention allow a user to display various user scores 1518 such as illustrated in FIG. 15. The interfaces also can display user trends 1520, departments scores 1522, department trends 1524, division scores 1526, division trends 1528, company scores 1530 and company trends 1532. This allows a manager or supervisor of an organization to view user and organizational scores and trends on one interface, such that the manager can view a large number of user and organizational scores and trends on one screen. Embodiments of the invention allow a manager to select which scores and trends to display, as well as selecting which levels of the organization (user, department, division, company) to display the scores and trends for.

Figure 16:
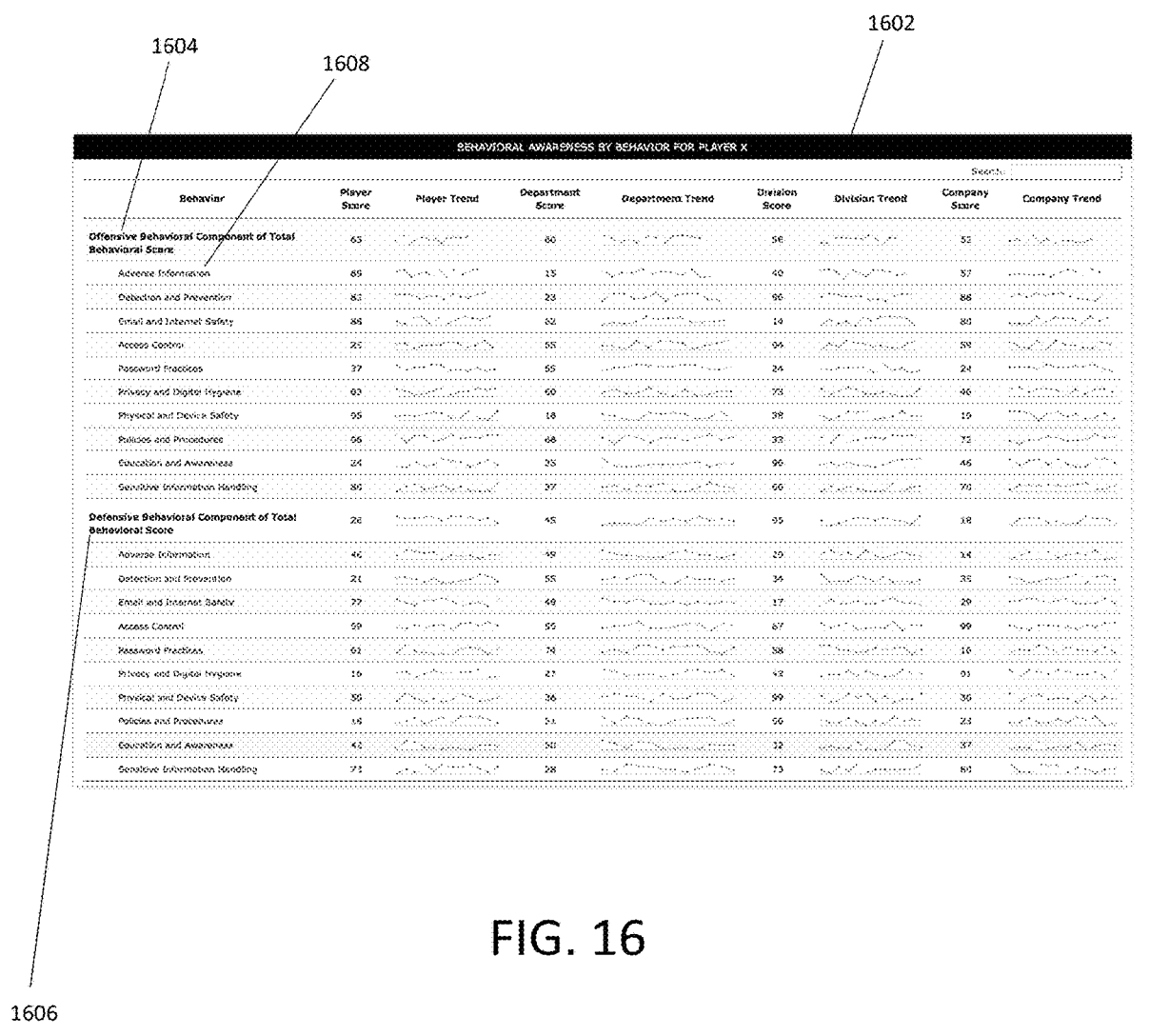

FIG. 16 illustrates another interface 1602 of the evaluation dashboard 114 displaying offensive behavioral components of total behavioral score 1604 and defensive behavioral components of total behavioral score 1606 with corresponding scores and trends displayed on a user, department, division and company level. The offensive behavioral components of total behavioral score 1604 include components 1608 of adverse information, detection and prevention, email and internet study, access control, password practices, privacy and digital hygiene, physical and device safety, policies and procedures, education and awareness and sensitive information handling. The defensive behavioral components of total behavioral score 1606 include the same components as in the offensive behavioral components of total behavioral score 1604.

Sequential and Overall Improvement: Using raw awareness scores, a sequential awareness improvement score A is computed to show awareness improvement between subsequent evaluation sessions:

$$\lambda(t) = \frac{A(t) - A(t-1)}{A(t-1)},$$

where t=1 represents the user's first evaluation and A(0)=0. Noe that $\lambda$ is not defined for the user's first evaluation session. Sequential awareness improvement does not require calibration, and values of $\lambda$ can be used with calibrating A. The value of $\lambda$ can be interpreted to be the user's percentage change in awareness between evaluations, with positive values indicating increased awareness and negative values indicating decreased awareness.

Likewise, an overall awareness improvement score A can be computed for the user's total awareness improvement over all evaluation sessions:

$$\Lambda(t) = \frac{A(t) - A(0)}{A(0)}.$$

In general, new users will tend to have lower awareness and overall improvement scores and higher sequential improvement scores relative to the overall user population. As users become more experienced with the evaluation, their awareness and understanding of its cybersecurity educational contents will improve, and thus their raw awareness scores will increase. At some point (after many play sessions), most users will reach the limit of their ability to improve of their raw awareness scores, at which point they will tend to have higher awareness and overall improvement scores and lower sequential improvement scores relative to the overall user population. This trend of lower-to-higher awareness/improvement and higher-to-lower sequential improvement is the hallmark of educational success for this training system.

Tracking these three scores for each individual user allows a user's management to analyze that user's initial and current cybersecurity awareness (both in a population-relative sense [i.e., a user ranking] and, after calibration, and global sense), assess awareness gaps (both overall and at the behavioral and/or component levels), and determine if learning is ongoing or if the user has reached the limit of their improvement under the current rule set.

Any component score that contributes to the value of a A, that is, any component in $\bar{c}$ or even sub-components that make up individual values in $\bar{c}$, can be tracked using the same techniques used for tracking progress against the overall awareness scores. In other words, for any component $c_i$ of $\bar{c}$, such as CompEff, or any sub-component $c_{i_j}$ of $c_i$, such as RealDefEff for behavior i, the component score itself can be used as a proxy for the user's relative awareness with respect to that component, and both sequential and overall improvement scores can be computed from the component score using the same algorithms described in herein.

The interpretations of the disaggregated sequential and overall improvement scores are identical to those of the overall scores and can be used, for example, to track a user's change in awareness down to individual behavioral concepts. However, because the individual component and sub-component scores $c_i$ and $c_{i_j}$ will not be calibrated in the same manner as the overall awareness score A, they cannot be thought of in a global awareness context and can only be used for assessing relative awareness rankings among users.

For the purpose of scoring user behavioral awareness, all offensive and defensive actions are grouped into exactly one of the default behavioral categories, listed in Table 1.

TABLE 1

Default behavioral scorings categories for offensive
and defensive actions, with default behavior importance
values used in computing composite scores

| Behavioral Grouping | Behavior Importance $Y_i$ |
|---|---|
| Adverse Information | 0.2 |
| Detection and Prevention | 0.1 |
| Email and Internet Safety | 1.0 |
| Access Control | 0.8 |
| Password Practices | 1.0 |
| Privacy and Digital Hygiene | 0.8 |
| Physical and Device Safety | 0.8 |
| Policies and Procedures | 1.0 |
| Education and Awareness | 0.5 |
| Sensitive Information Handling | 0.8 |

Additionally, pursuant to an action's cyber kill chain classification, all offensive and defensive actions are grouped into one of the default phases listed in Table 2 or Table 3, respectively. Then, when computing behavioral scores, the default assigned category weights are used based on the assigned phase of the action.

TABLE 2

Default phase categories for offensive actions,
with default behavioral scoring weights.

| Offensive Phase | Category Weight $\Omega_{j,i}$ |
|---|---|
| Reconnaissance | 0.6 |
| Exploitation/Access/Intrusion | 0.8 |
| Actions of Objectives | 1.0 |

TABLE 3

Default phase categories for defensive actions,
with default behavioral scoring weights.

| Defensive Phase | Category Weight $P_{k,j}$ |
|---|---|
| Anti-Reconnaissance | 0.6 |
| Anti-Intrusion | 0.8 |
| Anti-Action | 1.0 |

Defensive Risk Mitigation Parameters: User risk mitigation scores are computed based upon how well their defenses defend against various categories possible offensive actions. The computation uses the classical definition of risk to compute the risk mitigation score based on how damaging an attack would be if it were successfully executed. For this computation, outcomes are not considered; only the theoretical protection is important. The score components for each type of attack, grouped by attack result type, is shown in Table 4.

TABLE 4

Default risk groups for offensive action result
types, with default scoring weights for each group
based on the threat posed to the target user.

| Offensive Result Type Group | Group Weight $\alpha_{j,k}$ |
|---|---|
| Capability/Probability | 0.1 |
| Visibility/Intel | 0.2 |
| Exploitation/Access/Intrusion | 0.3 |
| Escalation/Persistency | 1.0 |
| Mischief | 0.5 |
| Confidentiality | 2.0 |
| Integrity | 1.6 |
| Availability | 1.8 |

A user's overall strategy as it relates to risk mitigation is categorized based on the progression of their risk mitigation posture over the course of an evaluation. User risk mitigation scores are computed and normalized over the course of the evaluation to produce a risk mitigation profile. These profiles are then compared to a set of known profiles that correspond to various risk mitigation strategies. The user is assigned a classification based on the strategy that they best match. Table 5 provides a mathematical description of each of these categories. In the table, coefficients are shown for various polynomials that can be used to reconstruct the shape of each normalized, baseline category. These polynomials can then be sampled in time (i.e., evaluation rounds) to aid in the comparison to the user. This computation can only take place at the conclusion of the evaluation.

TABLE 5

Coefficients used for reconstructing risk mitigation baseline profiles that can be used
for determining the user's risk mitigation categorical alignnment. The polynomial equations based
on these constants assume r(0) = 0 and r(1) = 1, which is the domain of the CRM computaion.

| Baseline Risk Mitigation Profile Classifications | Polynomial Coefficients for $CRM_{norm\ baseline}(r)$ Equations | | | | | |
|---|---|---|---|---|---|---|
| | $r^6$ | $r^5$ | $r^4$ | $r^3$ | $r^2$ | $r^1$ |
| Risk Averse | 0.0 | 0.0 | −8.0E-5 | 4.2E-3 | −4.9E-2 | 2.505E-1 |
| Risk Tolerant | 0.0 | 0.0 | −3.0E-5 | −2.1E-3 | 3.53E-2 | −2.28E-2 |
| Risk Hostile | 0.0 | 0.0 | −2.0E-4 | 5.2E-3 | −4.98E-2 | 2.902E-1 |
| Risk Taking | 0.0 | 0.0 | 2.0E-4 | −3.3E-3 | 2.03E-2 | 8.5E-3 |
| Balanced | 4.0E-5 | −1.3E-3 | 1.67E-2 | −9.83E-2 | 2.613E-1 | −1.465E-1 |

Tactics Parameters: User defensive tactics are grouped and weighted based on the category into which the user's discrete defensive actions fall, and tactical scores are determined based on these actions and their weights. Category weights for the user's awareness, readiness, and reactiveness are shown in Table 6, Table 4, and Table 7, respectively.

TABLE 6

Default awareness groups for defensive action types, with default scoring weights for each group.

| Defensive Awareness Group | Group Weight $\beta_k$ |
|---|---|
| Conceptual Awareness | 0.2 |
| Incident Detection | 0.6 |
| Active Vigilance | 1.0 |

TABLE 7

Default reactiveness groups for defensive action types, with default scoring weights for each group.

| Defensive Reactiveness Group | Group Weight $\rho_k$ |
|---|---|
| Planning and Procedures | 0.1 |
| Patching and Hardening | 0.1 |
| Capability Improvements | 0.1 |
| Incident Detections | 0.7 |
| Incident Responses | 1.0 |
| Incident Recoveries | 0.5 |
| Attribution and Counter-Actions | 0.9 |

In addition, defensive and offensive tactical results composite scores are computed using the component weights shown below, where $$\vec{d}_{res} = \begin{bmatrix} 0.5 \\ 1.0 \\ 0.8 \end{bmatrix}$$

provides defensive component results weights, and $$\vec{o}_{res} = \begin{bmatrix} 0.5 \\ 0.7 \\ 1.0 \\ 0.8 \end{bmatrix}$$

provides offensive component results weights.

Awareness and Learning Parameters: Overall awareness A for a single evaluation session is computed as the weighted sum of individual evaluation score components. Default weights for each component, listed in vector $\vec{c}$, are given as:

$$\vec{w}^T = \begin{bmatrix} 0.1 \\ 0.2 \\ 0.2 \\ 0.2 \\ 0.15 \\ 0.15 \end{bmatrix}.$$

In order to validate the evaluation software's effectiveness as a cybersecurity training tool—both initially and with subsequent content updates—embodiments of the invention determine the degree to which users' knowledge of critical cybersecurity concepts improves following evaluations, and the degree to which users' relevant behaviors become more-aligned with cybersecurity behavioral goals following evaluations. Periodic experimentation is used to test and validate performance along these two dimensions (learning and behavior).

Representative populations of test subjects are used to capture the software's impact on the general workforce, and relevant variables are controlled, such as age, education, work role, prior exposure to cybersecurity training, and others. Testing of each effectiveness dimension is done either separately or as a single combined test. The general outline for testing both dimensions is as follows:

Test subjects are given a pre-training test to determine each subject's baseline. Tests consist of one or more types of evaluation techniques: written questions and answers, multiple-choice or true/false questions, oral examination, live or simulated-live exercises, and open-ended discussion-style questions. Scores are not provided to test subjects during or after pre-testing.

Test subjects are split into either the experimental group or the control group. Members of the experimental group use the test software for training, while members of the control group are trained using another tool (evaluation or otherwise), according to that tool's usage instructions. A previously-validated version of the test software may be used as the control tool if the purpose of the experiment is to simply validate a software content update.

Members of the experimental group are placed into groups based on their pre-test scores. Some groups combine test subjects with similar scores, while other groups combine test subjects across a range of scores. Test subjects in these groups are provided with all educational materials and training required to play the evaluation, and then groups play the evaluation for a predetermined amount of time or number of matches.

After training, test subjects are re-tested to determine if and by how much their knowledge and/or behaviors have changed post-training. The same testing methods are used for post-training tests as are used for pre-training tests, though questions and tasks are not identical. Scores are not provided to test subjects during or after post-testing.

Following post-testing, a separate evaluation is given to the experimental group that involves additional questions and tests for specific recall, recognition, and interpretation tasks related to the evaluation's content. This is used to determine if test subjects understand the information being conveyed through evaluation play, infographics, icons, cause-effect scenarios, action descriptions, etc, independently of their performance on the post-test evaluation.

Pre- and post-training testing may involve the use of other tools to conduct simulated realistic or in-situ testing for phishing, smishing, vishing, watering hole, man-in-the-middle, and/or USB-based attacks, among others. Subjects from both the experimental and control groups are subject to evaluations and scenarios against which that group may or may not have been specifically trained. Relative effectiveness is computed between the experimental and control groups based on these results to validate the software's effectiveness relative to control techniques, industry-standard training tools, previous versions, etc.

Calibration: As part of validation testing, the software's in-evaluation metrics algorithms are used to produce metrics and analysis in accordance with the evaluation software's design. Metrics are compared and correlated with pre-training and post-training results. These correlations and comparisons are used to help anchor, correct, and calibrate evaluation play and training data metrics by updating sub- and component score weighting parameters using machine learning to determine appropriate weights for $\overline{d}_{res}$, $\overline{o}_{res}$, $\overline{w}^T$, and others.

Additionally, behavioral importance $Y_i$, group weights ($\alpha_{j,k}$, $\rho_k$, etc), and other score-computation weights are re-calibrated periodically in response to customer requests, industry reports, or other relevant cybersecurity events and developments that take place in the real world (e.g., a new attack type, increased activity for a given attack vector, etc). These weighting factors are updated through a combination of experimental validation results, machine learning, play-testing, and manual updates, to help ensure that users of the software are increasing their awareness of and improving their behaviors and responses to the most-relevant threat types.

The evaluation's scoring system provides an objective, detailed, risk-based set of learning and outcome scores that can be used to track employee and workforce performance, compare employees and workforces against each other, track learning against real-world cyber outcomes, and identify learning gaps and needs. The detailed, behavior-based scoring provides a substantial and unique advantage of recitation-based assessments that only score an employee's ability to memorize and recite content. The system guides user learning during evaluation play through live feedback, and it rewards users who demonstrate their conceptual understanding through their evaluation play. This feedback system serves to emphasize and underscore the importance of particular cybersecurity content and can be tuned to emphasize particular areas of focus for individuals and organizations. This system also provides advanced metrics that allow companies to proactively identify, track, and address individual and workforce awareness gaps.

Additionally, the evaluation's detailed scoring and metrics collection systems provide a means for directly computing, tracking, and reducing holistic organizational cybersecurity risk. This goes beyond traditional knowledge-based training systems that only assess a trainee's ability to recite information or in-situ testing systems that only test for one or two risks (and do not typically provide educational content unless a user fails). The system's scoring system is also able to provide predictive organizational risk assessments when new content is introduced into the evaluation or when new threats and risk areas are discovered based on retroactive analysis of previously-played evaluations, which is a feature that is completely unique to this type of assessment system.

Embodiments of the invention may be the evaluation designed to be played by at least one, independent user who is attempting to destroy their opponent's "objective data" while protecting their own objective data from attack. For any given evaluation session, the users can be any combination of one to four human users and zero to three computer users, as long as the total number of users is at least two.

Each user takes his or her turn in sequence over the course of an unlimited number of rounds, and users execution actions during their turn. Each user is given a fixed set of action choices from which the user must choose to execute one offensive action per round and zero or more defensive actions per round, according to that user's chosen strategies and objectives.

Offensive actions typically have one or more options that must be set by the user, including the target (another user or another user's objective data, generally) of the action's effects and any other action inputs ("intel") required to facilitate the action. Offenses that are configured using the correct combination of "intel" settings for a given target are successful; all other fail. Successful attacks yield some type of result that is valuable to the attacker, such as additional "intel", easier access to the target user's systems, or the ability to destroy one of the target user's objectives.

Defensive actions allow users reduce the impact or likelihood of attacks, recover from attacks, or increase the user's ability access to new actions. Defenses have an associated cost to play, and users can play as few or as many defenses on a given turn as they would like, provided that they have enough credits. Credits are earned each turn according to a user's "productivity," which can be increased through certain offensive or defensive actions taken by the user. Credits do not roll over between rounds.

The decision model for the systems's computer users is based upon maximizing that user's "utility" for a given set of actions at each decision point in the evaluation. The utility function is a multi-objective function whose weights are determined based on the computer user's assigned "personality." At the start of the evaluation, each computer user is assigned a random "primary" personality and a random "alter ego," which are both simply vectors of random objective weights. Then, at each decision point in the evaluation, the value of the utility function for that user is computed for all action combinations. Because offensive and defensive actions are fully independent, the offensive and defensive decisions are independent and can be computed, weighted, optimized, and selected in parallel. The utility score of actions where "intel" is required but not known are weighted according to the probability that the computer can randomly guess the value of the "intel." Users can select "easy", "medium", or "hard" computer users. Easy computer users always randomly guess the values of intel, regardless of whether or not it is known. Medium users will use known intel but will randomly guess at the values of unknown intel (i.e., with replacement—they will not record incorrect guesses). Hard computer users will record incorrect guesses and remove those bad guesses during subsequent attempts.

The combination of actions with the highest utility value is chosen. If multiple options share the same maximum utility value, those options are re-scored using the "alter ego" personality weights. If there are still multiple options deems to have the same, maximum utility value, then the computer user makes a random selection between those options.

The vector of objectives comprises several of the system's human user scoring metrics and several additional metrics that are computed only for the benefit of the computer users. Each metric is computed at its instantaneous value (i.e., the present value of the metric in that round, assuming the action's success) for every combination of actions available to the computer user. As already noted, individual score components are weighted by the probability of success, as determined by the need for the computer to "guess" the value of any required inputs, and the highest-utility decisions are selected and played.

The human user scoring metrics used are from the following list, which are described in the Scoring Algorithms described herein:
  Total Behavioral Score
  Total Effectiveness Score
  Total Defensive Posture Score
  Current Risk Mitigation Score
  Kill Chain Alignment Score Defensive Awareness Score Defensive Readiness Score Defensive Proactiveness Score The additional metrics, which are computed only for the benefit of the computer users, are described below:

Intel Metrics

Intel Gathering Credit: returns "1" if the action may result in gaining intel on a user, or "0" otherwise.

Intel Diversity Bonus: returns "1" if the action may result in gaining intel on a user for which the computer has no intel, or "0" otherwise.

Intel Completion Bonus: returns "1" if the action may result in either gaining all intel on a single user or in the computer having at least one piece of intel on every user, or "0" otherwise.

System Access Metrics

System Access Credit: returns "1" if the action may result in gaining access to a user's systems or "0" otherwise.

System Access Diversity Bonus: returns "1" if the action may result in gaining access to a user for which the computer has no access or "0" otherwise.

System Access Completion Bonus: returns "1" if the action may result in either gaining access to all systems of a single user or in the computer having access to at least one system for every user, or "0" otherwise.

The computer user's personalities are determined by weighting each of the score components listed above. Offensive and defensive personality weights are treated separately, and the sum of the component weights for each set (i.e., offense and defense) must add up to 100%. Individual component weights are in the range $[-1, 1]$, where negative weights will serve to discourage selection of potential choices and positive weights will serve to encourage selection of potential choices.

The relative difficulty of the computer users is controlled through the component value subranges assigned to specific components. For example, the "easy" computer user profile limits the subrange of the "Defensive Proactiveness" weight to be in the range $[-1,0.1]$, thereby making "easy" computer opponents less apt to being proactive on defense. Conversely, the "hard" computer user profile limits the "Action on Objectives Credit" weight to be in the range $[0.5,1]$, thereby making "hard" computer opponents more apt to being aggressive in targeting other users' objectives. Specific, individual instances of "easy," "medium," and "hard" computer users are still unique, however, as each computer instance uses randomized (uniform) values of the specific weights within the required subranges.

Non-randomized personas are also possible, allowing for set computer user personas that go beyond the "easy-medium-hard" set of random opponents. The evaluation s provides this as a customization option for business clients through the system configuration portal, and downloadable personas are available for all clients through a content store.

The system also provides a mechanism for creating computer users that behave in more human-like ways. This mechanism is optional and is provided as a customization option for business clients through the system configuration portal; this setting cannot be controlled through the client.

The mechanism works by providing computer users with action sequence templates that script the computer user's subsequent choices. Templates define prerequisite conditions that must exist in order to trigger the action sequence. Such conditions generally include actions that were taken in the previous round (by all users, including the computer), the action choices available to the computer user in the current round, the state of the evaluation vis-à-vis other users' objectives, and the computer user's knowledge of other users' intel. If any template's prerequisite conditions are satisfied, that action sequence is initiated, and the utility maximization decision model is either bypassed or augmented. If the prerequisite conditions of multiple templates are satisfied, the computer user uses the utility maximization decision model to score the valid templates and chooses the template with the highest utility.

Action sequence templates may encode complex action sequences that span multiple, non-contiguous rounds. For example, one action sequence may encode a type of "revenge," whereby the computer user targets its actions against a single other user repeatedly for several rounds in response to the apparent targeted aggression of that other user against the computer. In this scenario, this template's prerequisites involve three attributable attacks in a row of any type from a single other user (the "hostile" user). If this condition is satisfied, the "revenge" template is activated. This template encodes a rule that requires the computer user exclusively target the "hostile" user until it has destroyed one of that user's objectives. It then uses action sequencing logic that is built into the template to make all subsequent action choices until the "revenge" goal is accomplished.

Action sequencing logic can be deterministic (e.g., case switches) or probabilistic (e.g., Markov chains). For example, deterministic sequencing logic may encode a rule that the computer user always chooses "attack" actions when those actions are available, regardless of the computer user's knowledge of target user's intel. Conversely, probabilistic sequencing logic may encode a rule that the computer user chooses "attack" actions only 40% of the time if the required intel is unknown, with the remaining 60% being distributed to other choices.

Action sequences (and their probabilities) are created either manually (i.e., by developers or business client system managers) or by analyzing user sequence data using machine learning techniques to identify and extract play sequences and their respective probabilities from real play data. Dynamic Bayesian networks, hidden Markov models, and other similar techniques can be used to determine the states and their transition probabilities using the evaluation sequence data collected by the server and stored in the database for use in scoring, user metrics generation, and awareness and risk estimation.

FIG. 4 illustrates a scoring summary 402 of various users that may be displayed on the evaluation dashboard 114. The scoring summary 402 includes user names, risk reduction scores and trends, alerts, winning percentages and evaluation outcome distribution.

Figure 5:
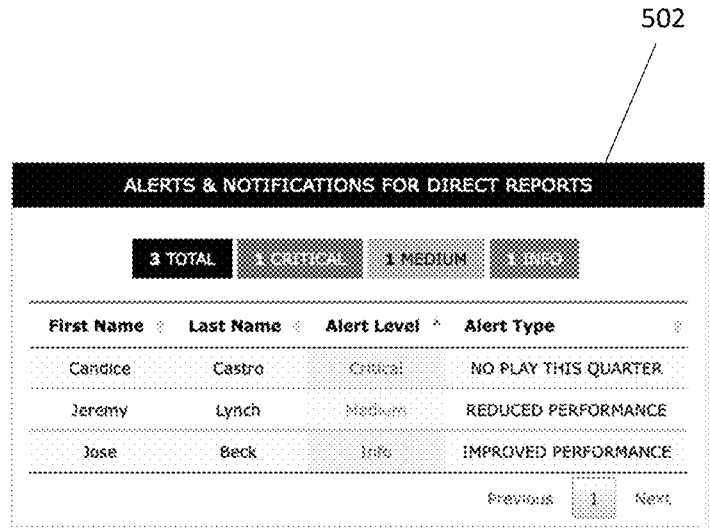
FIG. 5 is a drawing illustrating an evaluation dashboard interface displaying scoring in accordance with embodiments of the invention.

FIG. 5 illustrates an alerts and notifications screen 502 that may be displayed on the evaluation dashboard 114. The alerts and notifications screen 502 shows user names, alert levels and alert types.

Figure 6:
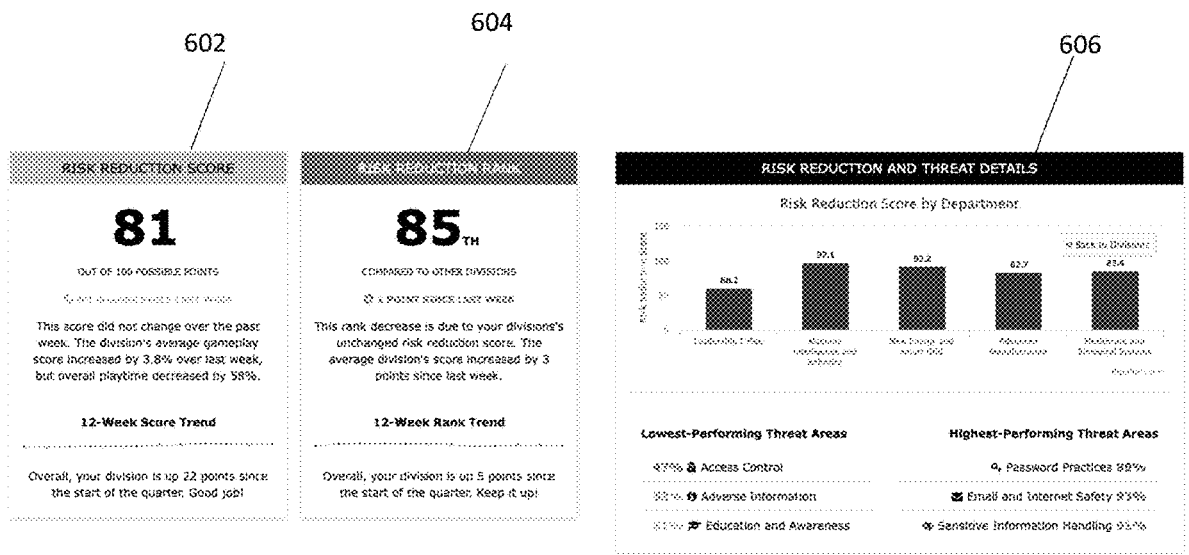
FIG. 6 is a drawing illustrating an evaluation dashboard interface displaying scoring in accordance with embodiments of the invention.

FIG. 6 illustrates a scoring interfaces 602, 604, 606 that may be displayed on the evaluation dashboard 114. The scoring interfaces includes a risk reduction score interface 602, a risk reduction rank interface 604 and a risk reduction and threat details interface 606. The risk reduction and threat details interface 606 includes lowest and highest performing threat areas.

FIG. 7 illustrates a scoring summary 702 that may be displayed on the evaluation dashboard 114. The scoring summary 702 is similar to the scoring summary 402 but includes more detail on scoring in specific areas, such as adverse information, detection and prevention, etc.

FIG. 8 illustrates a scoring summary 802 that may be displayed on the evaluation dashboard 114. The scoring summary 802 shows scores on an organizational and department level with associated trends.

Figure 9:
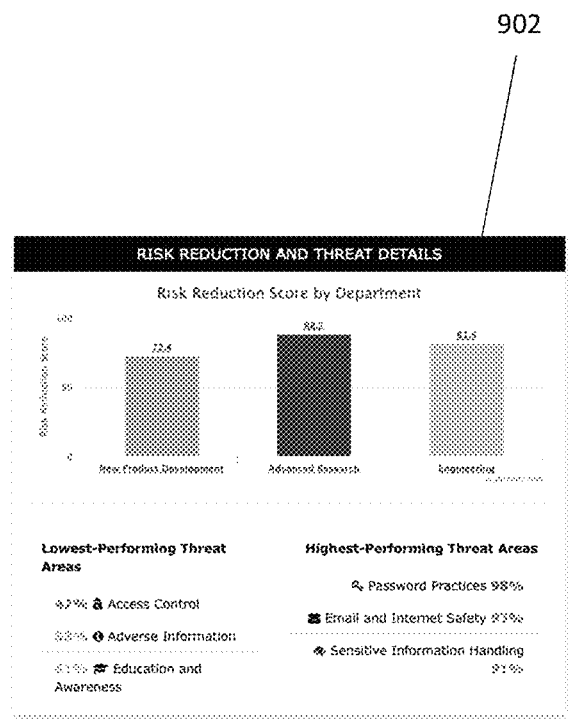
FIG. 9 is a drawing illustrating an evaluation dashboard interface displaying scoring in accordance with embodiments of the invention.
Figure 10:
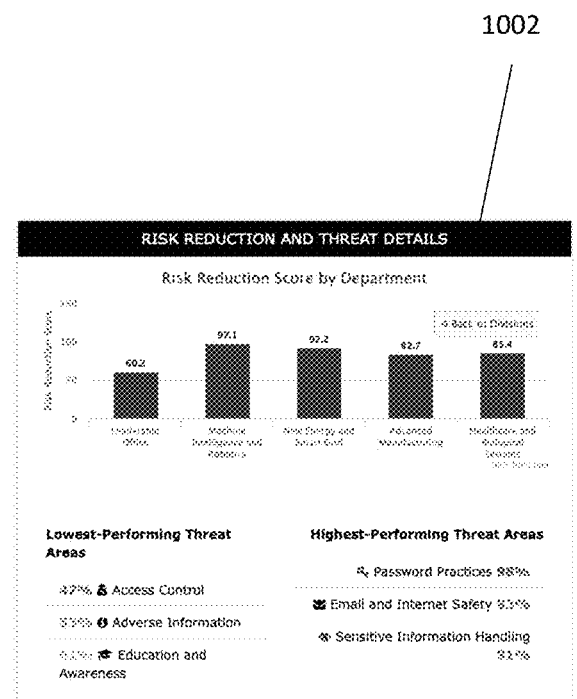
FIG. 10 is a drawing illustrating an evaluation dashboard interface displaying scoring in accordance with embodiments of the invention.

FIGS. 9 and 10 illustrate scoring summaries 902 and 1002 that may be displayed on the evaluation dashboard 114. The scoring summary 902, 1002 includes risk reduction and threat details by department.

Figure 11:
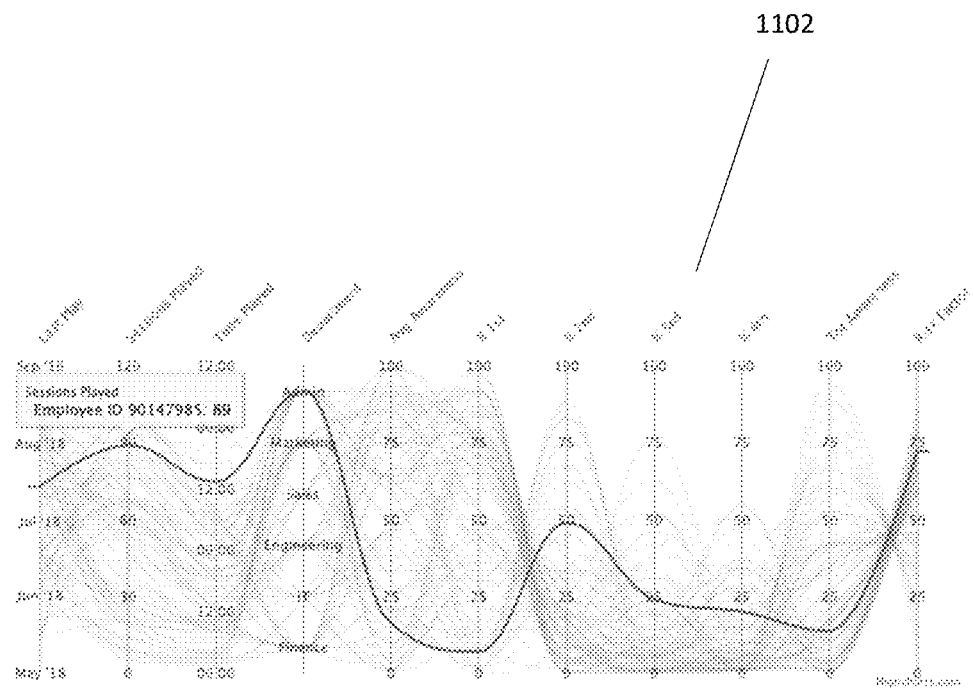
FIG. 11 is a drawing illustrating an evaluation dashboard interface displaying scoring in accordance with embodiments of the invention.

FIG. 11 illustrates a scoring summary 1102 that may be displayed on the evaluation dashboard 114. The scoring summary 1102 includes date of last play, sessions played, time played, department, average awareness, percentage finishing in $1^{st}$ through $4^{th}$, total awareness and risk factor.

Figure 12:
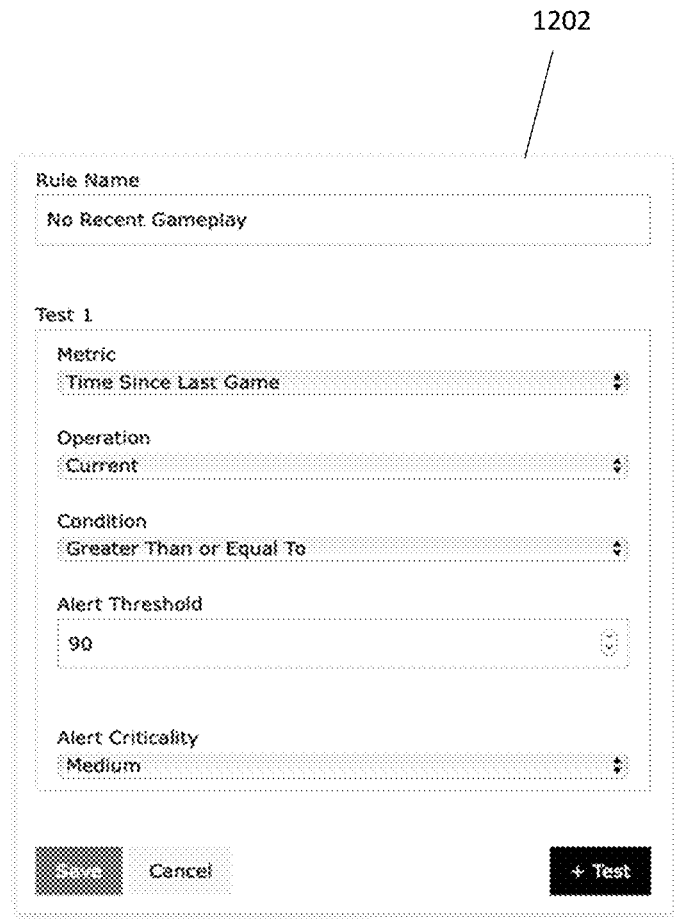
FIG. 12 is a drawing illustrating an evaluation dashboard interface displaying scoring in accordance with embodiments of the invention.

FIG. 12 illustrates an interface 1202 that may be displayed on the evaluation dashboard 114. The interface 1202 allows a user to create new alerts and set various values of the alert's rules, including a metric, an operation type, a condition and an alert criticality.

Figure 13:
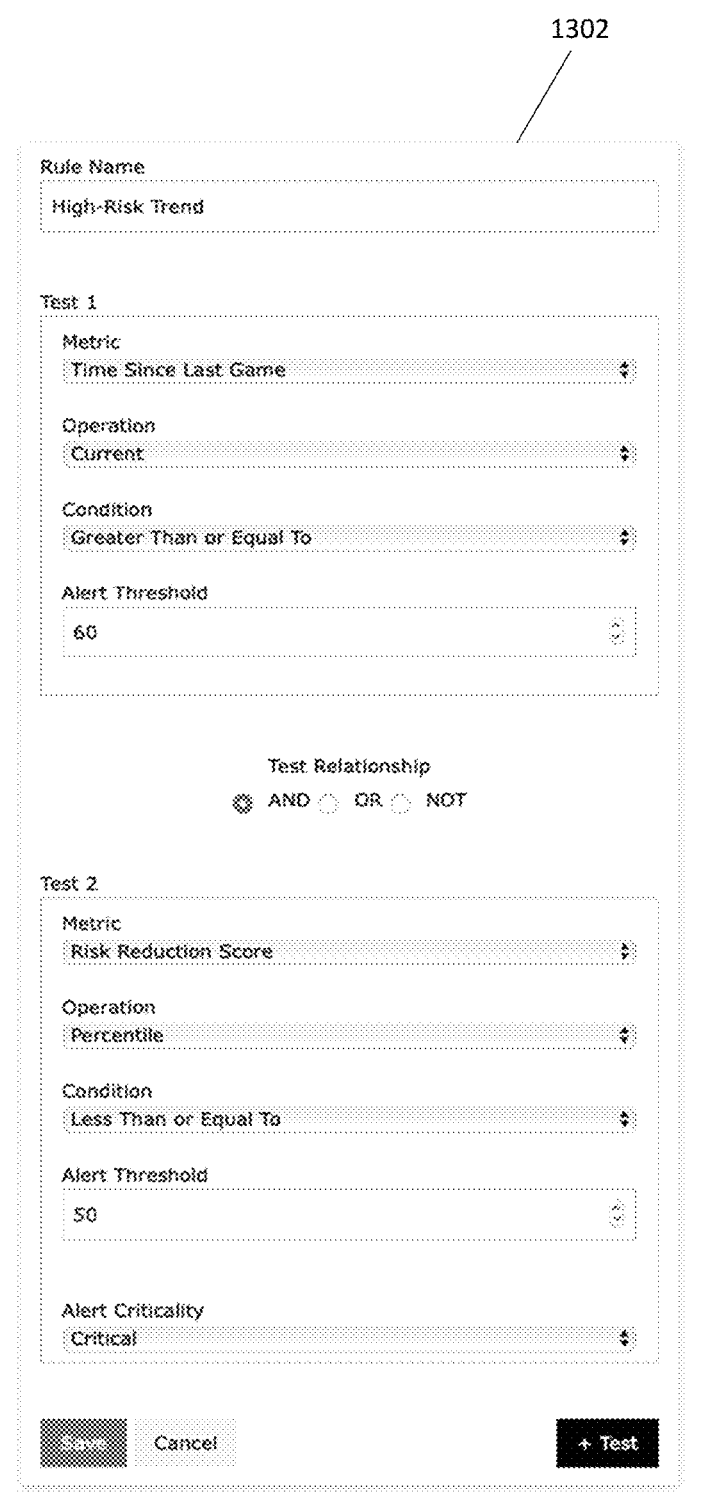

FIG. 13 illustrates an interface 1302 that may be displayed on the evaluation dashboard 114. The interface 1302 allows a user to create new alerts that combine multiple rules and set various values of the alert's rules, including a metric, an operation type, a condition and/or an alert criticality or alert threshold.

Figure 14:
FIG. 14 is a drawing illustrating an evaluation dashboard interface displaying scoring in accordance with embodiments of the invention.

FIG. 14 illustrates an interface 1402 that may be displayed on the evaluation dashboard 114. The interface 1402 allows a user to enable various in-evaluation content types, including email threats, internet browsing threats, privacy threats, physical threats and advanced persistent threats, as well as set the corresponding emphasis levels of the in-evaluation content.

It will be understood that the above described arrangements of apparatus and the methods are merely illustrative of applications of the principles of embodiments of the invention and many other embodiments and modifications may be made without departing from the spirit and scope of the invention as defined in the claims.

What is claimed is:

1. A system for evaluating cybersecurity awareness of an organization, comprising:
an evaluation server comprising a processor and a memory, the memory storing non-transitory machine-readable code to be executed by the processor;
at least one database storing a plurality of cybersecurity awareness evaluations, the database connected to the evaluation server;
a plurality of clients connected to the evaluation server, each of said clients comprising a processor, a memory and a display and configured to present at least one of the cybersecurity awareness evaluations to a user of said organization, said evaluation comprising output via the display of a set of pre-determined cybersecurity offensive actions to attack a competitor's virtual data assets, and a set of pre-determined cybersecurity defensive actions to protect said user's own virtual data assets, and receive inputs from said user, the user inputs comprising one or more user selections of from said sets of pre-determined cybersecurity offensive actions and cybersecurity defensive actions;
said machine-readable code configured to cause, when executed, said processor of said evaluation server to generate one or more scoring results of the cybersecurity awareness evaluations based upon the selected offensive and defensive actions of said user; and
an evaluation dashboard including at least one graphical user interface configured to display selected ones of the scoring results, the scoring results including a plurality of offensive component scores, each offensive component score corresponding to each user selection from said set of pre-determined cybersecurity offensive actions, a plurality of defensive component scores, each defensive component score corresponding to each user selection from said set of pre-determined cybersecurity defensive actions, a composite offensive score based on said plurality of offensive component scores, and a composite defensive score based on said plurality of defensive component scores.

2. The system of claim 1, wherein the server is further configured to determine and the evaluation dashboard is configured to display a defensive component score for all defensive actions of the users DefAll.sub.i:

$$DefAll_i = \frac{1}{M}\sum_{j}^{M}\sum_{k}^{K} P_{k,j}$$

where P.sub.k,j is a scoring weight for defensive actions, where each action DA.sub.k has been played and is active and where M is the total number of possible offensive actions.

3. The system of claim 1, wherein the server is further configured to determine and the evaluation dashboard is configured to display a defensive component score for effective defensive actions DefEff1.sub.i associated with behavior i for the user for at any point during an evaluation:

$$DefEff1_i = \frac{1}{M}\sum_{j}^{M}\Omega_{j,i},$$

where each offensive action OA.sub.j has been blocked, M is the number of blocked offensive actions and .OMEGA..sub.j,I is a scoring weight for offensive actions.

4. The system of claim 1, wherein the server is further configured to determine and the evaluation dashboard is configured to display a component offensive score OffAll.sub.i associated with behavior i at any point during an evaluation:

$$OffAll_i = \frac{1}{J}\sum_{j}^{J}\Omega_{j,i},$$

where offensive action OA.sub.j has been played and OMEGA..sub.j,i is a scoring weight for offensive actions.

5. The system of claim 1, wherein the server is further configured to determine and the evaluation dashboard is configured to display a component offensive effectiveness score OffEff1.sub.i associated with behavior i for at any point during an evaluation is $$OffEff1_i = \frac{1}{J}\sum_{j}^{J}\Omega_{j,i},$$

where each action OA.sub.j has been played and is successful by being not blocked and .OMEGA..sub.j,i is a scoring weight for offensive actions.

6. The system of claim 1, wherein the server is further configured to determine and the evaluation dashboard is configured to display a composite behavior score BAll1.sub.i: BAll.sub.i=DefAll.sub.i/P.sub.Ave+OffAll.sub.i/.OMEGA..sub.Ave, where P.sub.Ave is an average scoring weight for defensive actions, where .OMEGA..sub.Ave is an average scoring weight for offensive actions, where a component defensive score for all defensive actions of the user DefAll.sub.i:

$$DefAll_i = \frac{1}{M}\sum_j^M \sum_k^K P_{k,j}$$

where P.sub.k,j is a scoring weight for defensive actions, DA.sub.k is one of K defensive actions associated with offensive action, OA.sub.j, and where a component offensive score OffAll.sub.i associated with behavior i at any point during an evaluation is:

$$OffAll_i = \frac{1}{J}\sum_j^J \Omega_{j,i},$$

where offensive action OA.sub.i has been played and .OMEGA..sub.j,i is a scoring weight for offensive actions.

7. The system of claim 1, wherein the server is further configured to determine and the evaluation dashboard is configured to display a composite effectiveness score BEff1.sub.i:

BEff1.*sub.i*=DefEff1.*sub.i*/.OMEGA..*sub.Ave*+ OffEff1.*sub.i*/.OMEGA..*sub.Ave*, where .OMEGA..sub. Ave is an average scoring weight for offensive actions, where a component defensive score for effective defensive actions DefEff 1.sub.i associated with behavior i for the user for at any point during an evaluation is:

$$DefEff1_i = \frac{1}{M}\sum_j^M \Omega_{j,i},$$

where each offensive action OA.sub.i has been blocked, M is the number of blocked offensive actions, and .OMEGA..sub.j,i, is a scoring weight for offensive actions, and a component offensive effectiveness score OffEff 1.sub.i associated with behavior i for at any point during an evaluation is:

$$OffEff1_i = \frac{1}{J}\sum_j^J \Omega_{j,i},$$

where each action OA.sub.j has been played and is successful by being not blocked.

8. The system of claim 1, wherein the server is further configured to determine and the evaluation dashboard is configured to display a current risk mitigation score CRM (r):

$$CRM(r) = CRM(r-1) + \sum_k^K \sum_i^M \alpha_{j,k},$$

where each offensive action OA.sub.j that could theoretically be blocked by some defensive action DA.sub.k that has been played in a current round r, where M is a total number of possible offensive actions, K is the total number of defensive actions played in the round, and .alpha..sub.j,k is a scoring weigh related to the offensive action OA.sub.j that could be theoretically blocked by one of the defensive actions DA.sub.k played in the round.

9. The system of claim 8, wherein the server is further configured to determine and the evaluation dashboard is configured to display a total risk mitigation score TRM(r) for any given round r:

$$TRM(r) = \sum_{t=1}^r \left(\frac{CRM(t) + CRM(t-1)}{2}\right), \text{ where } CRM(0) = 0.$$

10. The system of claim 1, wherein the server is further configured to determine and the evaluation dashboard is configured to display a kill chain alignment score KCA(r) at some round r during the evaluation:

$$KCA(r) = KCA(r-1) + \sum_p^P KCC_p(r) \times KCR_p(r-1) \times \sigma_p(r),$$

where KCA(0)=0, KCA(R) is the users score at the end of the evaluation, r [1, R], R is a number of rounds played, p is a kill chain phase, with p=[1, P], KCCp(r) is a kill chain count, which is a number of defensive actions played during a given round r and for a given phase p, KCR.sub.p (r) is kill chain remaining, which is a total number of defensive actions available but not yet played by a given user at an end of a given round r and for a given phase p, where:

$$KCR_p(r) = KCR_p(r-1) - KCC_p(r),$$

where $$KCR_p(0) = \begin{cases} \tau_p & 1 \le p \le 3 \\ undef & p > 3 \,|\, p < 1 \end{cases},$$

and .tau..sub.p is the total number of defensive actions at the start of the evaluation for phase .rho. and, .sigma..sub.p(r) is a phase weight for phase p during some round r.

11. The system of claim 1, wherein the server is further configured to determine and the evaluation dashboard is configured to display a defensive awareness score DefAwr as:

$$DefAwr = \frac{1}{K}\sum_k^K \beta_k$$

where $\beta_k$ is a defensive awareness weight of some action $DA_k$ that is classified as a defensive awareness action of the user at some point during the evaluation, and K is a total number of defensive actions of all types of the user throughout the evaluation.

12. The system of claim 1, wherein the server is further configured to determine and the evaluation dashboard is configured to display a defensive readiness score:

$$DefRdy = \frac{1}{M}\sum_{k}^{K}\sum_{j}^{M}\alpha_{j,k}$$

where offensive action each $OA_j$ against the user and that could theoretically be blocked by some defensive action $DA_k$ of the user, M is a total number of offensive actions against the user, K is a total number of defensive actions of the user, and $\alpha_{j,k}$ is a scoring weight related to the offensive action $OA_j$ that could be theoretically blocked by any of the $DA_k$ defenses of the user during the evaluation.

13. The system of claim 1, wherein the server is further configured to determine and the evaluation dashboard is configured to display a defensive results score DefRes:

$$DefRes = \overline{d}_{res} \cdot \overline{r},$$

where $d_{res}$ is a vector of weights and r is a results vector defined as:

$$\overline{r} = \begin{bmatrix} x = \begin{Bmatrix} 0 & \text{user lost} \\ 1 & \text{user won} \end{Bmatrix} \\ y/Y \\ z/Z \end{bmatrix},$$

where y/Y is a ratio between a number of the users successfully defended data versus a total number of data targets assigned to that user, and z/Z is a ratio between a number of the user's undisclosed intel targets versus the total number of data targets assigned to that user.

14. The system of claim 1, wherein the server is further configured to determine and the evaluation dashboard is configured to display a offensive results score OffRes:

$$OffRes = \overline{o}_{res} \cdot \overline{s},$$

where $o_{res}$ is a vector of weights and s is a vector of results, where s is:

$$\overline{s} = \begin{bmatrix} i/I \times c_{avg} \\ h/H \\ o/O \\ -L/H \end{bmatrix}$$

where i is a number of Intel pieces gathered by the user at the end of the evaluation, I is a total number of Intel pieces available, $c_{avg}$ is an average number of possible values that each piece of Intel can assume, h is a total number of successful hacks performed by the user, H is a total number of successful hacks performed by the user, o is to total number of other users' objectives successfully hacked by the user, O is a total number of other users' objectives, and L is a number of successful hacks performed by the user when the user had not yet gathered the corresponding intel and thus had to guess at the value.

15. The system of claim 1, wherein the server is further configured to determine and the evaluation dashboard is configured to display a composite tactical score of said user.

16. The system of claim 1, wherein the server is further configured to determine and the evaluation dashboard is configured to display an overall awareness score of said user.

17. The system of claim 15, wherein the server is configured to determine one or more defensive scores for said user based upon the one or more defensive actions by said user, to determining one or more offensive scores for said user based upon the one or more offensive actions by said user, and wherein said composite tactical score of said user comprises a weighted combination of said one or more defensive and offensive scores of said user.

18. The system of claim 16, wherein the overall awareness score of said user is based upon one or more of scores reflecting a behavior, an effectiveness and a risk management of the user based upon said one or more offensive and defensive actions of the user.

19. A system for evaluating cybersecurity awareness of an organization, comprising:

an evaluation server comprising a processor and a memory, the memory storing non-transitory machine-readable code to be executed by the processor;

at least one database storing a plurality of cybersecurity awareness evaluations, the database connected to the evaluation server;

a plurality of clients connected to the evaluation server, each of said clients comprising a processor, a memory and a display and configured to present at least one of the cybersecurity awareness evaluations to a user of said organization and receive inputs from said user, the user inputs comprising user selections of cybersecurity offensive actions and cybersecurity defensive actions;

said machine-readable code configured to cause, when executed, said processor of said evaluation server to generate one or more scoring results of the cybersecurity awareness evaluations based upon the selected offensive and defensive actions of the users; and an evaluation dashboard including at least one graphical user interface configured to display selected ones of the scoring results, the scoring results including a plurality of offensive component scores for at least one of the users, a plurality of defensive component scores for the at least one of the users, at least one composite offensive score for the at least one of the users and at least one composite defensive score for the at least one of the users, the composite offensive score being determined based on a plurality of the offensive component scores and the composite defensive score being determined based on a plurality of the defensive component scores;

wherein said server is further configured to determine and said evaluation dashboard is configured to display a composite tactical score of said user, said composite tactical score comprises CompTac, wherein:

$$CompTac = \overline{\omega}_{tac} \cdot \overline{t}$$

where $\omega_{tac}$ is a vector of tactics component weights and t is a vector of tactics component scores, where t is defined as:

$$\bar{i} = \begin{bmatrix} DefAwr \\ DefRdy \\ DefPro \\ DefRes \\ OffRes \end{bmatrix}$$

where defensive awareness DefAwr is:

$$DefAwr = \frac{1}{K}\sum_{k}^{K} \beta_k$$

where $\beta_{sub.k}$ is a defensive awareness weight of some action $DA_{sub.k}$ that is classified as a defensive awareness action and of the user at some point during the evaluation, and K is a total number of defensive actions of all types of the user throughout the evaluation, where defensive readiness DefRdy is:

$$DefRdy = \frac{1}{M}\sum_{k}^{K}\sum_{j}^{M} \alpha_{j,k}$$

where each offensive action $OA_{sub.j}$ against the user and that could theoretically be blocked by some defensive action $DA_{sub.j}$ of the user, M is a total number of offensive actions against the user, K is a total number of defensive actions of the user, and $\alpha_{sub.j,k}$ is a scoring weight related to the offensive action $OA_{sub.j}$ that could be theoretically blocked by any of the $DA_{sb.j}$ defenses of the user during the evaluation, where defensive proactiveness is DefPro is: DefPro=1−DefRect, where Def Red: is:

$$DefRect = \frac{1}{K}\sum_{k}^{K} \rho_k$$

where $\alpha_{sub.j,k}$ is the defensive reactiveness of some action $DA_{sub.k}$ of the user at some point during the evaluation, K is a total number of defensive actions of all types of the user throughout the evaluation, where DefRes is:

$$DefRes = \bar{d}_{res} \cdot \bar{r},$$

where $d_{sub.res}$ is a vector of weights and r is a evaluation results vector defined as:

$$\bar{r} = \begin{bmatrix} x = \begin{Bmatrix} 0 & \text{player lost} \\ 1 & \text{player won} \end{Bmatrix} \\ y/Y \\ z/Z \end{bmatrix},$$

where y/Y is a ratio between a number of the user's successfully defended data versus a total number of data targets assigned to the user, and z/Z is a ratio between a number of the user's undisclosed intel targets versus the total number of data targets assigned to the user, and where Off Res is:

$$OffRes = \bar{o}_{res} \cdot \bar{s},$$

where $o_{sub.res}$ is a vector of weights and s is a vector of evaluation results, where s is:

$$\bar{s} = \begin{bmatrix} i/I \times c_{avg} \\ h/H \\ o/O \\ -L/H \end{bmatrix}$$

where i is a number of Intel pieces gathered by the user at the end of the evaluation, I is a total number of intel pieces available, $c_{sub.avg}$ is an average number of possible values that each piece of Intel can assume, h is a total number of successful hacks performed by the user, H is a total number of successful hacks performed by the user, o is to total number of other users' objectives successfully hacked by the user, 0 is a total number of other users' objectives, and L is a number of successful hacks performed by the user when the user had not yet gathered the corresponding intel and thus had to guess at the value.

20. A system for evaluating cybersecurity awareness of an organization, comprising:
an evaluation server comprising a processor and a memory, the memory storing non-transitory machine-readable code to be executed by the processor;
at least one database storing a plurality of cybersecurity awareness evaluations, the database connected to the evaluation server;
a plurality of clients connected to the evaluation server, each of said clients comprising a processor, a memory and a display and configured to present at least one of the cybersecurity awareness evaluations to a user of said organization and receive inputs from said user, the user inputs comprising user selections of cybersecurity offensive actions and cybersecurity defensive actions;
said machine-readable code configured to cause, when executed, said processor of said evaluation server to generate one or more scoring results of the cybersecurity awareness evaluations based upon the selected offensive and defensive actions of the users; and
an evaluation dashboard including at least one graphical user interface configured to display selected ones of the scoring results, the scoring results including a plurality of offensive component scores for at least one of the users, a plurality of defensive component scores for the at least one of the users, at least one composite offensive score for the at least one of the users and at least one composite defensive score for the at least one of the users, the composite offensive score being determined based on a plurality of the offensive component scores and the composite defensive score being determined based on a plurality of the defensive component scores;
wherein said server is further configured to determine and the evaluation dashboard is configured to display an overall awareness score of said user, said overall awareness score comprises A, wherein:

$$A = \bar{w} \cdot \bar{c},$$

where w is a vector of weights and c is a vector of score components defined as:

$c = [\text{CompAll CompEff DefPos } TRM\ KCA \text{ CompTac}]$ where CompAll is:

$$CompAll = Y_i \sum_i^N BAll_i,$$

where $Y_{sub.i}$ is an importance weighting factor for behavior I, $BAll_{sub.i} = DefAll_{sub.i}/P_{sub.Ave} + OffAll_{sub.i}/OMEGA_{sub.Ave}$, where $P_{sub.ave}$ is an average scoring weight for defensive actions, where $.OMEGA._{sub.Ave}$ is an average scoring weight for offensive actions, where a component defensive score for all defensive actions of the user $DefAll_{sub.i}$:

$$DefAll_i = \frac{1}{M} \sum_j^M \sum_k^K P_{k,j},$$

where $P_{sub.k,j}$ is a scoring weight for defensive actions, $DA_{sub.k}$ is one of K defensive actions associated with offensive action, $OA_{sub.j}$, and where a component offensive score $OffAll_{sub.i}$ associated with behavior i at any point during an evaluation is:

$$OffAll_i = \frac{1}{J} \sum_j^J \Omega_{j,i},$$

where offensive action $OA_{sub.j}$ has been taken and $.OMEGA._{sub.j,i}$ is a scoring weight for offensive actions where CompEff:

$$CompEff = Y_i \sum_i^N BEff1_i,$$

where $$BEff1_i = \frac{DefEff1_i}{\Omega_{Ave}} + \frac{OffEff1_i}{\Omega_{Ave}}.$$

where $.OMEGA._{sub.Ave}$ is an average scoring weight for offensive actions, where a component defensive score for effective defensive actions $DefEff1_{sub.i}$ associated with behavior i for the user for at any point during an evaluation is:

$$DefEff1_i = \frac{1}{M} \sum_j^M \Omega_{j,i},$$

where each offensive action $OA_{sub.i}$ has been blocked, M is the number of blocked offensive actions, and $.OMEGA._{sub.j,i}$ is a scoring weight for offensive actions, and a component offensive effectiveness score $OffEff1_{sub.i}$ associated with behavior i for at any point during an evaluation is:

$$OffEff1_i = \frac{1}{J} \sum_j^J \Omega_{j,i},$$

where each action $OA_{sub.j}$ has been taken and is successful by being not blocked, where DefPos is:

$$DefPos_i = \frac{1}{M} \sum_j^M \Omega_{j,i} \sum_k^K P_{k,j},$$

for each possible $OA_{sub.j}$ and where $DA_{sub.k}$ has been taken and is active, M is the total number of possible offensive actions, where TRM is:
a total risk mitigation score TRM(r) for any given round r:

$$TRM(r) = \sum_{t=1}^{r} \left( \frac{CRM(t) + CRM(t-1)}{2} \right), \text{ where } CRM(0) = 0.$$

$$CRM(r) = CRM(r-1) + \sum_k^K \sum_j^M \alpha_{j,k},$$

where each offensive action $OA_{sub.j}$ that could theoretically be blocked by some defensive action $DA_{sub.k}$ that has been played in a current round r, where M is a total number of possible offensive actions, K is the total number of defensive actions played in the round, and $.alpha._{sub.j,k}$ is a scoring weight related to the offensive action $OA_{sub.j}$ that could theoretically be blocked by one of the defensive actions $DA_{sub.k}$ taken in the round,
where KCA is:

$$KCA(r) = KCA(r-1) + \sum_p^P KCC_p(r) \times KCR_p(r-1) \times \sigma_p(r),$$

where KCA(O)=0, KCA(R) is the user's score at the end of the evaluation, r=[1, R], R is a number of rounds played, p is a kill chain phase, with p=[1, P], $KCC_{sub.p}(r)$ is a kill chain count, which is a number of defensive actions taken during a given round r and for a given phase p, $KCR_{sub.p}(r)$ is kill chain remaining, which is a total number of defensive actions available but not yet taken by a given user at an end of a given round r and for a given phase p, where:

$$KCR_p(r) = KCR_p(r-1) - KCC_p(r),$$

where $$KCR_p(0) = \left\{ \begin{array}{ll} \tau_p & 1 \leq p \leq 3 \\ undef & p > 3 \mid p < 1 \end{array} \right\},$$

and $\tau_p$ is the total number of defensive actions at the start of the evaluation for phase $\rho$ and $\sigma_p(r)$ is a phase weight for phase p during some round r.

\* \* \* \* \*